(12) United States Patent
Ryu et al.

(10) Patent No.: US 10,177,959 B2
(45) Date of Patent: Jan. 8, 2019

(54) METHOD AND APPARATUS FOR OPERATING TRANSMISSION/RECEPTION TERMINAL THROUGH RESOURCE ALLOCATION OF D2D COMMUNICATION IN WIRELESS COMMUNICATION SYSTEM

(71) Applicant: Samsung Electronics Co., Ltd, Gyeonggi-do (KR)

(72) Inventors: Hyun-Seok Ryu, Gyeonggi-do (KR); Seung-Hoon Park, Seoul (KR); Jeong-Ho Park, Seoul (KR); Hyun-Kyu Yu, Gyeonggi-do (KR); Cheol Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/115,653

(22) PCT Filed: Dec. 29, 2014

(86) PCT No.: PCT/KR2014/012996
§ 371 (c)(1),
(2) Date: Jul. 29, 2016

(87) PCT Pub. No.: WO2015/115738
PCT Pub. Date: Aug. 6, 2015

(65) Prior Publication Data
US 2017/0171897 A1 Jun. 15, 2017

(30) Foreign Application Priority Data

Jan. 29, 2014 (KR) .................. 10-2014-0011624
Apr. 3, 2014 (KR) .................. 10-2014-0040003

(51) Int. Cl.
*H04L 29/08* (2006.01)
*H04W 72/02* (2009.01)
(Continued)

(52) U.S. Cl.
CPC ........ *H04L 29/08306* (2013.01); *H04L 5/006* (2013.01); *H04L 5/0044* (2013.01);
(Continued)

(58) Field of Classification Search
CPC ... H04W 76/023; H04W 92/18; H04W 84/18; H04W 72/02; H04W 72/04; H04L 29/08306
See application file for complete search history.

(56) References Cited

U.S. PATENT DOCUMENTS

| 8,526,342 | B2 | 9/2013 | Esteves et al. |
| 9,042,938 | B2 * | 5/2015 | Nimbalker .......... H04W 72/048 455/550.1 |

(Continued)

FOREIGN PATENT DOCUMENTS

| WO | WO 2011/143496 A1 | 11/2011 |
| WO | WO 2013/006652 A1 | 1/2013 |

OTHER PUBLICATIONS

International Search Report dated May 8, 2015 in connection with International Application No. PCT/KR2014/012996; 7 pages.

(Continued)

*Primary Examiner* — Nathan Mitchell

(57) ABSTRACT

The present disclosure relates to a pre-5th-Generation (5G) or 5G communication system to be provided for supporting higher data rates Beyond 4th-Generation (4G) communication system such as Long Term Evolution (LTE). According to various embodiments, an electronic device over resource allocation of device to device (D2D) communication in a wireless communication system comprises at least one processor configured to generate D2D control information for the D2D communication, and at least one processor configured to transmit the D2D control information through symbols for at least one of a Physical Downlink Control CHan- (Continued)

nel (PDCCH), a Physical Uplink Shared CHannel (PUSCH), and Demodulation-Reference Signal (DM-RS).

20 Claims, 27 Drawing Sheets

(51) Int. Cl.

| | | |
|---|---|---|
| *H04W 72/04* | (2009.01) | |
| *H04W 84/18* | (2009.01) | |
| *H04W 92/18* | (2009.01) | |
| *H04W 4/70* | (2018.01) | |
| *H04W 76/14* | (2018.01) | |
| *H04L 5/00* | (2006.01) | |
| *H04W 4/06* | (2009.01) | |

(52) U.S. Cl.
CPC .......... *H04L 5/0051* (2013.01); *H04L 5/0053* (2013.01); *H04W 4/70* (2018.02); *H04W 72/02* (2013.01); *H04W 72/04* (2013.01); *H04W 76/14* (2018.02); *H04W 84/18* (2013.01); *H04W 92/18* (2013.01); *H04W 4/06* (2013.01); *H04W 72/042* (2013.01)

(56) References Cited

U.S. PATENT DOCUMENTS

| | | | | |
|---|---|---|---|---|
| 9,143,291 B2* | 9/2015 | Kuchibhotla | ....... | H04W 76/023 |
| 9,191,961 B2* | 11/2015 | Jang | .................... | H04W 72/082 |
| 9,219,593 B2* | 12/2015 | Jang | .................... | H04W 76/043 |
| 9,325,480 B2* | 4/2016 | Narasimha | ............ | H04L 5/0058 |
| 9,516,653 B2* | 12/2016 | Yang | .................. | H04W 72/042 |
| 9,565,679 B2* | 2/2017 | Lee | ........................ | H04L 1/0025 |
| 2010/0272029 A1 | 10/2010 | Laroia et al. | | |
| 2013/0148637 A1 | 6/2013 | Yang et al. | | |
| 2014/0086152 A1* | 3/2014 | Bontu | .................... | H04L 1/1812 370/329 |
| 2015/0201406 A1* | 7/2015 | Zhang | ................. | H04W 76/023 370/330 |
| 2016/0056940 A1* | 2/2016 | Chae | ..................... | H04L 5/0055 370/312 |
| 2016/0255647 A1* | 9/2016 | Zhu | ................... | H04W 72/1278 370/329 |
| 2016/0374068 A1* | 12/2016 | Kim | ...................... | H04W 72/04 |
| 2017/0164396 A1* | 6/2017 | Matsumoto | ........ | H04W 72/1278 |

OTHER PUBLICATIONS

Written Opinion of the International Searching Authority dated May 8, 2015 in connection with International Application No. PCT/KR2014/012996; 7 pages.

ZTE, "Control Channel Design for D2D Link", 3GPP TSG-RAN WG1 Meeting #75, R1-135369, San Francisco, CA, Nov. 11-15, 2013, 5 pages.

Qualcomm Incorporated, "Control for D2D Broadcast Communication", 3GPP TSG-RAN WG1 #73, R1-135319, San Francisco, CA, Nov. 11-15, 2013, 4 pages.

LG Electronics, "D2D Communication Physical Channel Design", 3GPP TSG RAN WG1 Meeting #75, R1-135480, San Francisco, CA, Nov. 11-15, 2013, 8 pages.

Panasonic, 3GPP TSG RAN WG1 Meeting #74, R1-133210, Barcelona, Spain, Aug. 19-23, 2013, 6 pages.

Francois Baccelli, et al., "On the Design of Device-to-Device Autonomous Discovery", IEEE, 2012, 9 pages.

* cited by examiner

| Congestion | Transmission Window Size |
|---|---|
| Yes | Increase |
| No | Decrease |

(a) 2-level Transmission Window size

| Congestion | Transmission Window Size |
|---|---|
| High | A |
| Medium | B |
| Low | C |

(b) 3-level Transmission Window size

| Congestion | Transmission Window Size |
|---|---|
| Level 1 | TW1 |
| Level 2 | TW2 |
| Level 3 | TW3 |
| Level 4 | TW4 |
| ⋮ | ⋮ |

(c) 4-level or more Transmission Window size

FIG.10

METHOD AND APPARATUS FOR OPERATING TRANSMISSION/RECEPTION TERMINAL THROUGH RESOURCE ALLOCATION OF D2D COMMUNICATION IN WIRELESS COMMUNICATION SYSTEM

CROSS REFERENCE TO RELATED APPLICATION(S) AND CLAIM OF PRIORITY

The present application claims priority under 35 U.S.C. § 365 to International Patent Application No. PCT/KR2014/012296 filed Dec. 29, 2014, entitled "METHOD AND APPARATUS FOR OPERATING TRANSMISSION/RECEPTION TERMINAL THROUGH RESOURCE ALLOCATION OF D2D COMMUNICATION IN WIRELESS COMMUNICATION SYSTEM", and, through International Patent Application No. PCT/KR2014/012296, to Korean Patent Application No. 10-2014-0011624 filed Jan. 29, 2014, and to Korean Patent Application No. 10-2014-0040003 filed Apr. 3, 2014, each of which are incorporated herein by reference into the present disclosure as if fully set forth herein.

TECHNICAL FIELD

The present invention relates generally to an apparatus and a method for supporting Device to Device (D2D). More particularly, the present invention relates to resource allocation for communication in D2D, and a control information transmission technique therefor.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In recent, as prevalence of smart phones accelerates, a variety of application services using the smart phone is activated. It is expected that such an aspect will accelerate more. Hence, various techniques for effectively preventing data increase due to various application services in a cellular system are emerging. For example, as massive mobile contents are used, Device to Device (D2D) communication for efficiently distributing load of a base station using proximity of a mobile communication terminal is drawing attention. For example, the D2D is adopted as a study item of current $3^{rd}$ Generation Partnership Project (3GPP) Long Term Evolution (LTE) release 12 and standardized by Radio Access Network (RAN)1.

LTE standardizes the D2D communication for the sake of public safety. That is, the D2D communication is to fulfill reliable communication between devices when a base station is collapsed due to a natural disaster such as earthquake or tsunami. Also, when an urgent operation such as fire and terror suppression is conducted, the D2D communication in a region (e.g., a shadow area and a base station coverage hole) outside coverage of the base station needs to seamlessly perform the communication between devices without aid of the base station. Thus, ensuring link reliability is more important than increasing band efficiency or system throughput which was a requirement of an existing cellular communication.

The conventional cellular system supports control information of various types. However, the D2D communication under the standardization for the current LTE Rel-12 may not need all of such control information. For example, as the current D2D communication aims at groupcast/broadcast communication, rather than unicast communication mostly used in the cellular, 3GPP RAN1/RAN2 meeting already agreed not to perform any type of Layer1 (L1:PHY)/L2 (Media Access Control (MAC), Packet Data Convergence Protocol (PDCP), Radio Link Control (RLC)) feedbacks. On this assumption, research on which control information is required for the D2D groupcast/broadcast communication is demanded.

Also, an existing cellular Frequency Division Duplexing (FDD) system uses different frequency bands for uplink and downlink transmission/reception (e.g., $f_1$ band for the downlink, $f_2$ band for the uplink). Accordingly, the base station transmits over the $f_1$ band and receives over the $f_2$ band, and the device transmits over the $f_2$ band and receives over the $f_1$ band. Meanwhile, in an existing cellular Time Division Duplexing (TDD) system, the downlink and the uplink are conducted in the same frequency band but are time-divided and used. That is, the uplink and downlink transmissions are divided and conducted on a frequency or a time axis.

However, the D2D communication performs transmission/reception in the uplink. For example, provided that the D2D communication operates in the FDD system, a D2D transmitter transmits over the uplink $f_2$ band and a D2D receiver receives over the uplink $f_2$ band. Similarly, in the D2D communication operating in the TDD system, a D2D transmitter transmits using uplink subframes and a D2D receiver receives using uplink subframes. Since the D2D communication is performed through the uplink, it is possible to consider reusing Uplink Control Information (UCI) and Physical Uplink Control CHannel (PUCCH) which were used in the existing cellular system, as control information and a control channel for the D2D. However, the uplink in LTE employs Single Carrier (SC)-Frequency Division Multiple Access (FDMA) having better Peak-to-Average Power Ratio (PAPR) characteristic than Orthogonal FDMA (OFDMA), regardless of the FDD/TDD. When one device transmits over the PUCCH and a Physical Uplink Shared CHannel (PUSCH) at the same time, the single carrier characteristic cannot be retained and thus it is not advantageous to transmit D2D control information over the PUCCH. Hence, it is demanded to design a new control channel for the D2D.

Also, in the existing cellular system, the base station performs centralized resource allocation based on various feedback information from the device. However, since the D2D communication does not have the feedback information between devices, a method for performing distributed resource allocation is demanded. The distributed resource allocation can suffer from a resource collision due to the same resource allocation because it does not have a coordinator for arbitrating in the resource allocation. Thus, measures for addressing this are demanded.

DETAILED DESCRIPTION OF THE INVENTION

Technical Problem

The object of the present invention to solve relates to designs of control information and a control channel for Device to Device (D2D) communication and resource allocation, and relates to an operating method and an apparatus of transmission/reception devices through resource allocation of D2D communication in a wireless communication system for designing contents and size of the control information and the control channel for delivering the control information, and for distributively allocating resource between devices.

Technical Solution

According to one embodiment of the present invention to achieve the above object, a method for operating a transmission device over resource allocation of D2D communication in a wireless communication system includes mapping D2D control information for the D2D communication to at least one of a Physical Downlink Control CHannel (PDCCH), a Physical Uplink Shared CHannel (PUSCH), and Demodulation-Reference Signals (DM-RS); and transmitting the D2D control information mapped to at least one of the PDCCH, the PUSCH, and the DM-RS, to a reception device.

According to another embodiment of the present invention to achieve the above object, an apparatus for operating a transmission device over resource allocation of D2D communication in a wireless communication system includes a mapping processing unit for mapping D2D control information for the D2D communication to at least one of a PDCCH, a PUSCH, and DM-RS; and a transmitting unit for transmitting the D2D control information mapped to at least one of the PDCCH, the PUSCH, and the DM-RS, to a reception device.

According to yet another embodiment of the present invention to achieve the above object, a method for operating a reception device over resource allocation of D2D communication in a wireless communication system includes, when D2D control information for the D2D communication is mapped to at least one of a PDCCH, a PUSCH, and DM-RS and transmitted, receiving at least one of the PDCCH, the PUSCH, and the DM-RS to which the D2D CI is mapped; and extracting the D2D control information by restoring at least one of the PDCCH, the PUSCH, and the DM-RS received.

In various embodiments, extracting the D2D control information can, when the D2D control information is mapped to symbols of the PDCCH and received, extract at least one of a groupcast Identifier (ID) and a broadcast ID of a group defining a range of the D2D communication from the D2D control information.

In various embodiments, extracting the D2D control information can, when the D2D control information is mapped to symbols of the PUSCH and received, extract the D2D control information by demultiplexing from modulated data information of the PUSCH.

In various embodiments, extracting the D2D control information can, when the D2D control information is mapped to the DM-RS and received, extract new data indicator information as the D2D control information.

Extracting the new data indicator information can extract using a 1-bit parameter value.

According to still another embodiment of the present invention to achieve the above object, an apparatus for operating a reception device over resource allocation of D2D communication in a wireless communication system includes a receiving unit for, when D2D control information for the D2D communication is mapped to at least one of a PDCCH, a PUSCH, and DM-RS and transmitted, receiving at least one of the PDCCH, the PUSCH, and the DM-RS to which the D2D CI is mapped; and a control information extracting unit for extracting the D2D control information by restoring at least one of the PDCCH, the PUSCH, and the DM-RS received.

According to a further embodiment of the present invention to achieve the above object, a method for operating a transmission device over resource allocation of D2D communication in a wireless communication system includes setting a resource structure to include at least one or more resource pool having a plurality of resource blocks based on a certain time; allocating a resource for a signal to transmit by shifting the resource blocks of the resource pool on a time axis at an interval of the certain time; and transmitting the signal to a reception device using the allocated resource.

In various embodiments, allocating the resource can shift the resource blocks such that a shift interval of resource pool is different from a shift interval of another resource pool.

When an interval where the certain time is added up for a certain number of times is a unit period, allocating the resource can allocate a resource allocated by grouping per unit period.

According to a further embodiment of the present invention to achieve the above object, an apparatus for operating a transmission device over resource allocation of D2D communication in a wireless communication system includes a resource structure setting unit for setting a resource structure to include at least one or more resource pool having a plurality of resource blocks based on a certain time; a resource allocating unit for allocating a resource for a signal to transmit by shifting the resource blocks of the resource pool on a time axis at an interval of the certain time; and a transmission interface unit for transmitting the signal to a reception device using the allocated resource.

According to a further embodiment of the present invention to achieve the above object, a method for operating a reception device over resource allocation of D2D communication in a wireless communication system includes, when a resource for a signal is allocated according to a resource structure including at least one or more resource pool having a plurality of resource blocks based on a certain time, receiving the signal from a transmission device through the allocated resource; and decoding the received signal.

When an interval where the certain time is added up for a certain number of times is a unit period, the allocated resource can be allocated by grouping per unit period.

Receiving the signal from the transmission device further includes determining whether the signal is information relating to its group when the signal is transmitted through the resource allocated by grouping per unit period, and the signal can be received when the signal corresponds to the information relating to its group.

Determining whether the signal is the information relating to its group can, when receiving system frame information indicating information about a resource allocated by grouping per unit period from the transmission device, determine whether the signal is the information relating to its group using the system frame information.

Receiving the signal from the transmission device can further include, when the signal is transmitted through the resource allocated by grouping per unit period, switching to a standby mode when the signal is not the information relating to its group.

According to a further embodiment of the present invention to achieve the above object, an apparatus for operating a reception device over resource allocation of D2D communication in a wireless communication system includes a reception interface unit for interfacing reception of a signal transmitted from a transmission device; a control unit for, when a resource for a signal is allocated according to a resource structure including at least one or more resource pool having a plurality of resource blocks based on a certain time, controlling to receive the signal from the transmission device through the allocated resource; and a decoder for decoding the received signal.

According to a further embodiment of the present invention to achieve the above object, a method for operating a transmission device over resource allocation of D2D communication in a wireless communication system includes receiving signals for the D2D communication during a certain time; detecting energy levels of resource blocks respectively corresponding to the signals received during the certain time; and determining a transmission timing of data for the D2D communication according to a congestion level corresponding to the detected energy levels.

Determining the transmission timing of the data for the D2D communication can include comparing the energy levels with a certain threshold; determining the congestion level according to a comparison result of the energy levels with the certain threshold; and determining the transmission timing corresponding to the determined congestion level.

Determining the transmission timing can increase a transmission window size of the transmission timing as a congestion degree according to the determined congestion level increases.

According to a further embodiment of the present invention to achieve the above object, an apparatus for operating a transmission device over resource allocation of D2D communication in a wireless communication system includes a signal receiving unit for receiving signals for the D2D communication during a certain time; an energy level detecting unit for detecting energy levels of resource blocks respectively corresponding to the signals received during the certain time; and a transmission timing control unit for determining a transmission timing of data for the D2D communication according to a congestion level corresponding to the detected energy levels.

Effects of the Invention

According to the present invention, the D2D communication can be achieved more reliably through the CI and the control channel design for the D2D communication.

Also, by reducing the overhead of the CI for the D2D communication, the CI transmission is enabled by merely transmitting the data channel without a separate physical control channel design.

Also, when the devices select the resource distributively, the devices determine their situation and regulate their transmission opportunity by themselves, and thus the resource collision can be prevented in advance.

Also, for the information not related to its group, the reception device can switch to the standby mode and thus reduce power consumption.

BRIEF DESCRIPTION OF THE DRAWINGS

For a complete understanding of the present invention and its effects, the following descriptions are made with reference to the accompanying drawings, where like reference numerals represent like parts.

FIG. 10 is a reference diagram illustrating a random back-off operation according to a congestion level in Device to Device (D2D) corresponding to an embodiment of the present invention.

BEST MODE FOR CARRYING OUT THE INVENTION

Figure 1:
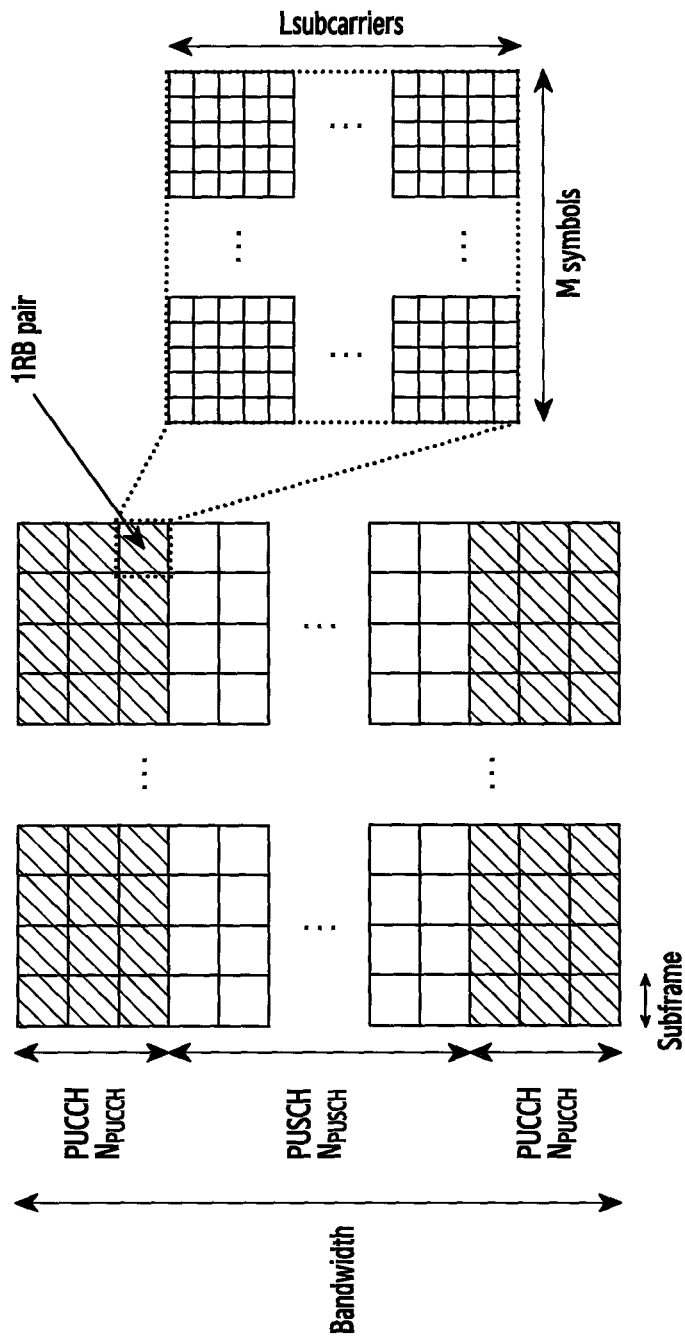
FIG. 1 is a reference diagram illustrating a Physical Uplink Control CHannel (PUCCH) control channel structure to be compared with the present invention.

FIG. 1 through FIG. 26 used to explain principles of the present invention in this patent application are merely exemplary and shall not be construed as limiting the scope of the invention. One of ordinary skilled in the art will appreciate that the principles of the present invention can be implemented in any wireless communication system appropriately deployed.

Control information, a control channel, and resource allocation required to explain contents of the present invention are described first.

1. Control Information

In a cellular communication, a base station transmits various control information to a device through a downlink, and the device transmits various control information to the base station through an uplink. The control information transmitted from the base station to the device through the downlink is referred to as Downlink Control Information (DCI), and the control information transmitted from the device to the base station through the uplink is referred to as Uplink Control Information (UCI). The DCI and UCI have various formats and CIs according to a purpose of control as below.

(1) Various Formats and Important CI Summary of DCI
1) DCI format 0: Physical Uplink Control CHannel (PUCCH) scheduling information
2) DCI format 1: Physical Downlink Shared CHannel (PDSCH) scheduling information
3) DCI format 1A: PDSCH compact scheduling information
4) DCI format 1B: DCI format 1A+precoding information
5) DCI format 1C: PDSCH very compact scheduling+ Multicast Control CHannel (MCCH) Information
6) DCI format 1D: DCI format 1B+power offset information (Multi-User (MU) Multiple Input Multiple Output (MIMO) purpose)
7) DCI format 2: PDSCH scheduling (closed-loop MIMO purpose) information
8) DCI format 2A: PDSCH scheduling (open-loop MIMO purpose) information
9) DCI format 2B: PDSCH scheduling (beamforming using Demodulation-Reference Signals (DM-RS)) information
10) DCI format 2C: PDSCH scheduling (Spatial Multiplexing using the DM-RS) information
11) DCI format 3: 1-bit PUCCH, PUSCH Transmit Power Control (TPC) command information
12) DCI format 3A: 2-bit PUCCH, PUSCH TPC command information
13) DCI format 4: PUSCH scheduling (multi-antenna port transmission mode)

(2) Various Formats and Important CI Summary of UCI
1) UCI format 1: Scheduling Request (SR)
2) UCI format 1a: 1-bit Hybrid Automatic Repeat reQuest (HARQ) Acknowledgement (ACK)/Negative ACK (HACK) with or without SR
3) UCI format 1b: 2-bit HARQ ACK/NACK with or without SR
4) UCI format 2: Channel Quality Information (CQI)
5) UCI format 2a: CQI+1-bit HARQ ACK/NACK
6) UCI format 2b: CQI+2-bit HARQ ACK/NACK 2. Control Channel To transmit the CI of various types, Long Term Evolution (LTE) is using various methods, which can be divided largely into two.
1) Transmit the CI over an Independent Physical Control Channel
2) Multiplex the CI with Data Information and Transmit over a Data Channel LTE defines various physical control channels. Among them, the above-stated CIs are transmitted over a Physical Downlink Control CHannel (PDCCH) and a PUCCH. For example, the DCI is transmitted from a base station to a device over the PDCCH of the downlink, and resides in 1~3 Orthogonal Frequency Division Multiplexing (OFDM) symbols of each subframe. Meanwhile, the UCI is transmitted from the device to the base station over the PUCCH of the uplink, and resides in resource block(s) of a frequency axis at both ends of each subframe.

Meanwhile, when the device is allocated a PUSCH resource for data transmission in the uplink, the corresponding device needs to transmit the CI in the uplink. In this case, the corresponding device can multiplex the uplink CI into the allocated PUSCH and transmit to the base station, rather than using the PUSCH and the PUCCH at the same time.

3. Resource Allocation

A subject of the resource allocation in a cellular system is the base station. That is, the base station allocates a resource to a device according to various scheduling conditions (e.g., fairness) based on channel information of every device residing in a cell managed by itself. For example, the device having the uplink resource allocated from the base station reports its buffer status to the base station. In so doing, information for the Buffer Status Report (BSR) is carried by a MAC control element of the PUSCH. A device not having a resource allocated to report the buffer status makes a SR to the base station. In so doing, as the SR is made through the PUCCH, only devices capable of using the PUCCH (i.e., the device allocated the PUCCH) can perform Status Report (SR) when requesting the scheduling to the base station. A device not allocated the PUCCH to transmit the SR to the base station obtains a resource for the BSR through a random access process. Also, the device reports a downlink channel measurement result to the base station (e.g., UCI format 4, 5, 6) on a periodic basis or at a command of the base station. Based on this, the base station notifies resource information (e.g., a resource size, Modulation and Coding Scheme (MCS)) to be received at each device, to the device over the PDCCH. The device can obtain CI by decoding the PDCCH, and, based on this, decode its data transmitted in the downlink over the PDSCH.

Meanwhile, for uplink channel measurement, the base station can request Sounding Reference Signal (SRS) transmission from the device on a periodic or aperiodic basis. At a command of the base station, the device transmits the SRS to the base station. The base station can obtain an uplink channel status of each device from the received SRS. Based on the obtained uplink channel status and the BSR information received from the device over the PUSCH, the base station allocates an uplink resource which can be used by each device. The uplink resource allocation information is transmitted to the device using the DCI over the PDCCH (e.g., DCI format 0, DCI format 4).

The present invention defines contents and size of the CI for the D2D communication, the CI, and control channels to design the control channel for carrying the CI as below. Hereafter, contents of the present invention are described based on the contents relating to the above-stated CI, control channel, and resource allocation.

1. Contents and Size of CI

1) General Cellular System

The D2D communication is conducted over the uplink PUSCH. Accordingly, DCI format 0 or DCI format 4 which is the information relating to the scheduling of the PUSCH of the DCI used in the existing LTE cellular system can be a candidate of the CI for the D2D communication. Since antenna configuration for the current D2D communication assumes one transmit antenna and two receive antennas, DCI format 0 is expected to be suitable for the CI for the D2D communication, rather than DCI format 4 supporting a multi antenna port. However, using DCI format 4 as the CI for the D2D communication cannot be excluded because a later Rel-13 or Rel-14 can cover the D2D communication using the multi-antenna. The CI in DCI format 0 and DCI format 4 is described in more detail as below.

① DCI Format 0
Carrier indicator (0 or 3 bits)
Flag for DCI format 0/DCI format 1A differentiation (1 bit)
Frequency hopping flag for PUSCH (1 bit)
Resource block assignment ($\lceil \log 2(N_{RB}^{UL}(N_{RB}^{UL}+1)/2 \rceil$ bits)
Herein, $N_{RB}^{UL}$ denotes the number of Resource Blocks (RBs) constructing a UL subframe. Assuming a bandwidth of 10 [MHz], $N_{RB}^{UL}=50$ and thus total 11 bits are required.
MCS and redundancy version (5 bits)
New data indicator (1 bit)
Cyclic shift for DM-RS and OCC index (3 bits)
CSI request (1 or 2 bits)
SRS request (0 or 1 bit)
Resource allocation type (1 bit, only present if)

② DCI Format 4
Carrier indicator (0 or 3 bits)
Resource block assignment ($\lceil \log 2(N_{RB}^{UL}(N_{RB}^{UL}+1)/2) \rceil$ bits)
TPC command for PUCCH (2 bits)
MCS per transport block (5×2=10 bits)
Redundancy version per transport block (2×2=4 bits)
New data indicator per transport block (1×2=2 bits)
Cyclic shift for DM-RS and OCC index (3 bits)
SRS request (0 or 1 bit)
Resource allocation type (1 bit, only present if)

The CI constituting DCI format 4 and DCI format 0 are almost similar. Yet, since DCI format 4 supports the multi-antenna, MCS, Redundancy Version (RV), and New Data Indicator (NDI) information are required per transport block. Since the multi-antenna can transmit up to two transport blocks in the LTE, such CI in DCI format 4 becomes two times the DCI format 0.

2) D2D Communication of the Present Invention

A general cellular system utilizes PUSCH hopping to obtain frequency diversity in the uplink PUSCH transmission, and there are two PUSCH hopping types of type 1 and type 2. The type 2 PUSCH hopping has a cell-specific hopping pattern and performs the hopping based on a sub-band unit. 1 bit hopping flag information transmitted in the DCI format 0 corresponds to the type 1 and adopts slot-based hopping. That is, when PUSCH hopping flag=0 in the DCI format 0, it means no hopping in two slots constituting one PUSCH subframe. Since the present invention considers a separate pre-defined timed hopping pattern for the D2D communication, the 1 bit PUSCH hopping flag can be information not required any more.

Meanwhile, since the D2D communication has no feedback, the D2D may not need feedback information such as TPC command for PUCCH, SRS request, or CSI request any more. Also, the CI for the D2D communication uses only one format, and accordingly the flag bit for identifying the format 0 and the format 1 may not be required. A carrier indicator, which is information required for carrier aggregation, may not be adequate for the CI for the D2D. Finally, since the D2D performs the transmission/reception through the uplink subframe, UL/DL may not be distinguished. Hence, 1 bit information for the resource allocation type may not be needed in the D2D. Hence, this can be arranged as below.

① D2D CI Format A
Resource block assignment ($\lceil \log 2(N_{RB}^{UL}(N_{RB}^{UL}+1)/2) \rceil$ bits)
Herein, $N_{RB}^{UL}$ denotes the number of RBs constructing the UL subframe. Assuming a bandwidth of 10 [MHz], $N_{RB}^{UL}=50$ and thus total 11 bits are required.
MCS (5 bits or 10 bits)
Redundancy version (1 bit or 4 bits)
New data indicator (1 bit or 2 bits)
Cyclic shift for DM-RS and OCC index (3 bits)

Hence, assuming a bandwidth of 10 [MHz], the CI for the D2D needs 11+5+1+1+3=21 bits (for DCI format 0) or 11+10+4+2+3=30 bits (for DCI format 4).

However, when the D2D identically fixes an amount of the resource which can be used for the D2D communication per device, the CI of 11 bits required for resource block assignment can reduce. Also, since the D2D has no feedback, it can be difficult to apply an adaptive modulation and coding scheme or a link adaptation scheme such as power control. Also, since the D2D communication targets at reliability of the link, rather than band efficiency or throughput enhancement, it can be advantageous to use the fixed MCS using a lower modulation rate and a low coding rate. Hence, 5 bits or 10 bits information notifying the MCS information may not be necessary. RV and NDI in the existing cellular communication were used in the HARQ method. For example, when HARQ Chase Combining (CC) is performed, the same information is retransmitted and accordingly NDI information is required. This is for the device to determine whether to combine data or whether not to combine because it is new data. However, when HARQ Incremental Redundancy (IR) is conducted, the same information is not retransmitted and accordingly the RV information notifying a start point of a circular buffer is required. A receiving stage can perform the IR using the RV information received from a transmitting stage even though different information from initial transmission is received. Since there is no feedback in the D2D communication, it seems that the CI such as RV or NDI is not necessary. However, since the D2D communication conducts high-reliability transmission, the transmitting stage needs to perform the repeated transmission. In other words, the HARQ performs the transmitting stage transmits->the receiving stage checks Cyclic Redundancy Code (CRC) and then detects error->the receiving stage transmits NACK to the transmitting stage->the transmitting stage retransmits. However, in the D2D communication, the transmitting stage performs the repeated transmission. In so doing, the number of repetitions and information about whether to repeatedly transmit in the form of the IR or the CC can be needed. It is known that the IR can achieve higher coding gain than the CC but increases complexity of the receiving stage. Also, it is known that the coding gain of the IR increases as a higher MCS is used. Since the D2D communication uses a low MCS (e.g., Quadrature Phase Shift Keying (QPSK) 1/12), it is expected that there is no great performance difference even though the CC repeated transmission is performed, compared with the IR repeated transmission, and that the complexity of the receiving stage can reduce using the CC. Hence, the CI of 1 bit (for DCI format 0) or 2 bits (for DCI format 4) for the NDI can be necessary. Finally, when the D2D communication uses a predefined cyclic shift value, the CI of 3 bits is not necessary any more. Thus, necessary information for the D2D can be reduced to 1 bit as below.

② D2D CI Format B
New data indicator (1 bit or 2 bits)
2. Control Channel
1) General Cellular System In case of a separate physical control channel PDCCH, 16-bit CRC which is masked with User Equipment (UE) IDentifier (ID) (Cell Radio Network Temporary Identifier (C-RNTI)) is added to DCI per UE generated by the base station in the existing cellular system, encoded with rate 1/3 tail-biting convolution code, and multiplexed with DCI of other UEs through a rate matching process. The plurality of the multiplexed DCI is cell-specific and subframe specific scrambled and symbolized through QPSK modulation. The symbolized DCI is interleaved and mapped to OFDM symbols of the PDCCH through a cell-specific cyclic shift pattern.

In a separate physical control channel PUCCH, the device transmits various feedback information to the base station over the PUCCH. The PUCCH cannot be compared with the present invention and thus its detailed descriptions are omitted.

When the CI is multiplexed and transmitted with data information, when the device has data to transmit over the PUSCH, the CI can be transmitted over the PUSCH, rather than the PUCCH. That is, the data and the CI each pass through different coding block rate matching, and modulator, and then data symbols and CI symbols are multiplexed through Time division Multiplexing (TDM). The TDM data symbols and CI symbols pass through Discrete Fourier Transform (DFT) and Inverse Fast Fourier Transform (IFFT) and constitute SC-FDM symbols.

2) D2D Communication of the Present Invention

When a size of the CI for the D2D communication is the D2D CI format A, it can take a structure for transmitting uplink CI through the PDCCH structure and the PUSCH. However, the CI format B can be transmitted through a structure for transmitting uplink CI over the PUSCH or the DM-RS.

① Transmit D2D CI Format a over the Separate Physical Control Channel PDCCH

The D2D communication is differentiated from the existing cellular communication in that it groupcasts or broadcasts and accordingly cannot mask the 16-bit CRC added to the CI with the UE-ID (C-RNTI). Hence, masking is conducted with a newly defined group-RNTI or broadcast RNTI. Meanwhile, instead of the cell-specific scrambling, the group-specific scrambling should be used. Hence, a scrambling sequence generator should be initialized to $$c_{init} = \left\lfloor \frac{n_s}{2} \right\rfloor \cdot 2^9 + N_{ID}^{group}.$$

In so doing, a group of $N_{ID}^{group}$ can include a firefighter group, a police officer group, and so on by way of example, and each group can use a predefined ID of its own.

② Multiplex D2D CI Format A/B with Data Information (Transmit Uplink CI over PUSCH)

It follows the same procedure with the existing cellular system. In so doing, the CI is mapped to symbols closest to the DM-RS of the PUSCH.

③ Transmit D2D CI Format B Using DM-RS

The DM-RS cannot carry information because the type and the size of the CI are various in the existing cellular communication. However, the D2D CI format B, which is 1-bit information, can transmit the DI through the DM-RS. First, the cyclic shift and Orthogonal Complementary Code (OCC) information used in the existing cellular communication are described. A sequence mapped to the uplink DM-RS of the current LTE is explained with reference to the following Equations 1 through 4.

$$r_{PUSCH}^{(\lambda)}(m \cdot M_{SC}^{RS}+n) = w^{(\lambda)}(m) r_{u,v}^{(\alpha_\lambda)}(n) \quad [\text{Equation 1}]$$

Here, each parameter means as follows.
$\lambda \in \{0, 1, \ldots, \upsilon-1\}$: the number of layers used for the transmission ($\upsilon$: the number antenna ports)
m=0, 1
n=0, ..., $M_{SC}^{RS}-1$ and $M_{SC}^{RS}=M_{SC}^{PUSCH}$ ($M_{SC}^{RS}$: the number of subcarriers constituting a reference signal)
$w^{(\lambda)}(m)$: orthogonal sequence
$r_{u,v}^{(\alpha_\lambda)}(n)$: base sequence
u: sequence group number (0~29)
v: base sequence number
$\alpha_\lambda$: cyclic shift in a slot $n_s$ where $\alpha_\lambda = 2\pi \cdot n_{cs,\lambda}/12$
At this time, $n_{cs,\lambda}$ is defined based on the following Equation 2.

$$n_{cs,\lambda} = (n_{DMRS}^{(1)} + n_{DMRS,\lambda}^{(2)} + n_{PN}(n_s)) \bmod 12 \quad [\text{Equation 2}]$$

Herein, $n_{DMRS}^{(1)}$ is transmitted to the device through a higher layer, and $n_{DMRS,\lambda}^{(2)}$ is the cyclic shift value contained in the DCI. Meanwhile, $n_{PN}(n_s)$ is defined based on the following Equation 3.

$$n_{PN}(n_s) = \Sigma_{i=0}^{7} c(N_{symb}^{UL} \cdot n_s + i) \cdot 2^i \quad \text{[Equation 3]}$$

At this time, $N_{symb}^{UL}$ denotes the number of uplink symbols, and c(i) denotes a pseudo-random sequence. c(i) is initialized at a start portion of each radio frame using the following Equation 4.

$$c_{init} = \left\lfloor \frac{N_{ID}^{cell}}{30} \right\rfloor \cdot 2^5 + f_{ss}^{PUSCH} \quad \text{[Equation 4]}$$

At this time, $f_{ss}^{PUSCH}$ denotes a sequence shift pattern of the PUSCH, and $f_{ss}^{PUSCH} = (f_{ss}^{PUCCH} + \Delta_{ss}) \mod 30$. $f_{ss}^{PUCCH} = N_{ID}^{cell} \mod 30$ and $\Delta_{ss} \in \{0, 1, \ldots 29\}$. $N_{ID}^{cell}$ denotes a cell ID and $\Delta_{ss}$ is configured through a higher layer.

The D2D communication can reduce overhead by using predefined cyclic shift and OCC values. Hence, all of the parameters changing through a higher layer in the above Equations 1 through 4 need to use fixed values. For example, $\lambda$, $n_{DMRS}^{(1)}$, $M_{SC}^{RS}$, u, v, $\Delta_{ss}$, and so on are used. Also, the existing cellular communication transmits values of $n_{DMRS,\lambda}^{(2)}$ and $w^{(\lambda)}(m)$ to be used in the PUSCH through the DCI format 0. Such values should be fixed in the D2D. Meanwhile, $N_{ID}^{cell}$ should be defined as $N_{ID}^{group}$. To transmit 1 bit information of the new data indicator in the DM-RS, the following two predefined parameter values can be used.

When NDI=0 (repetition), $n_{DMRS,\lambda}^{(2)}$=0, $[w^{(\lambda)}(0) \ w^{(\lambda)}(1)]$=[1 1], When NDI=1 (new data), $n_{DMRS,\lambda}^{(2)}$=6, $[w^{(\lambda)}(0) \ w^{(\lambda)}(1)]$=[1 −1], The above values are exemplary, and two arbitrary fixed values can be used. Since the receiving stage does not know which value of the two parameters is used to transmit the DM-RS, it is necessary to determine a final value after performing detection on every case.

3. Resource Allocation

1) General Distributed Resource Allocation

The distributed resource allocation operation based on existing energy sensing is as follows. First, signals are received during a predefined sensing interval. Next, energy levels of all RBs in the received sensing interval are measured. Next, data is transmitted by selecting the RB(s) of the lowest energy level.

Through such a procedure, the resources for the D2D communication can be spatially reused. However, such a dispersion-based greedy approach has a disadvantage that it is vulnerable to a collision problem or a congestion problem caused when several devices select the same resource at the same time.

In order to overcome such a disadvantage, X [%] minimum energy rule or a blank RB has been considered. When the device selects RB(s) to transmit data, the X [%] minimum energy rule is a method of sorting the energy levels and randomly selecting RB(s) having the energy level of the lowest X [%] (e.g., 5 [%]), rather than selecting RB(s) of the lowest energy. This method has an advantage that the collision or the congestion can be randomized, but cannot be a solution when traffic increases or load is considerable.

Meanwhile, in the blank RB scheme, a user stops the transmission in RB for transmitting and receives in the RB for transmitting. In so doing, it is assumed that transmission of the same data is repeated. That is, when a user who repeatedly transmitting data stops the transmission for a certain time and receives data, the user using RB can determine whether or not another user performs data transmission. When there is no data transmission of another user, a corresponding user conducts the data transmission again. Otherwise, when there is data transmission of another user, a corresponding user abandons the data transmission in its selected RB and performs the data transmission by reselecting another RB. The blank RB method has a disadvantage of losing its transmission opportunity.

2) Distributed Resource Allocation of the Present Invention

The present invention is operated based on the distributed resource allocation or the energy sensing, and adopt the following procedure.

First, signals are received during a predefined sensing interval. Next, energy levels of all RBs in the received sensing interval are measured. Next, a transmission timing is adjusted based on a predefine congestion level.

That is, after the energy sensing, a data transmission interval varies according to the congestion level determined by the device, rather than transmitting data in a next interval. The congestion level can be defined as two levels of high/low, three levels of High/medium/low, or more than four levels of Level 1, Level 2, Level 3, Level 4, . . . . For example, the two levels can determine that the congestion level is low when the number of RBs having the energy level below a predefined threshold is greater than X or when the number of RBs having the energy level over the predefined threshold is smaller than X (on the contrary, the congestion level is high). Also, the congestion level being low can be determined when the number of RBs having the energy level below the predefined threshold exceeds Y [%] of the whole RB or when the number of RBs having the energy level over the predefined threshold falls below Y [%] of the whole RB (on the contrary, the congestion level being high can be determined). Similarly, the congestion level more than three levels or four levels can be defined. In so doing, the transmission time corresponding to each congestion level is a value which should be defined as standard in advance.

Details of the present invention will be described as below by referring to the accompanying drawings.

FIG. 1 illustrates a PUCCH control channel structure to be compared with the present invention. Assuming that there are N-ary RBs in a frequency domain within a given bandwidth, the PUCCH occupies $N_{PUCCH}$-ary RBs at both ends of a frequency band. The other RBs are used for transmission of ($N_{PUCCH}$)PUSCH. In so doing, the RB includes L subcarriers on the frequency axis and M symbols (SC-FDM symbols) on the time axis.

When the control channel for the D2D communication is designed, the PUCCH control channel structure of the existing LTE system can be considered. However, for a D2D transmitter for transmitting data in the D2D communication to maintain the single carrier characteristic, the simultaneous transmission of the PUCCH and the PUSCH is infeasible. Thus, the PUCCH structure as the control channel for the D2D communication may not be desirable.

Figure 2:
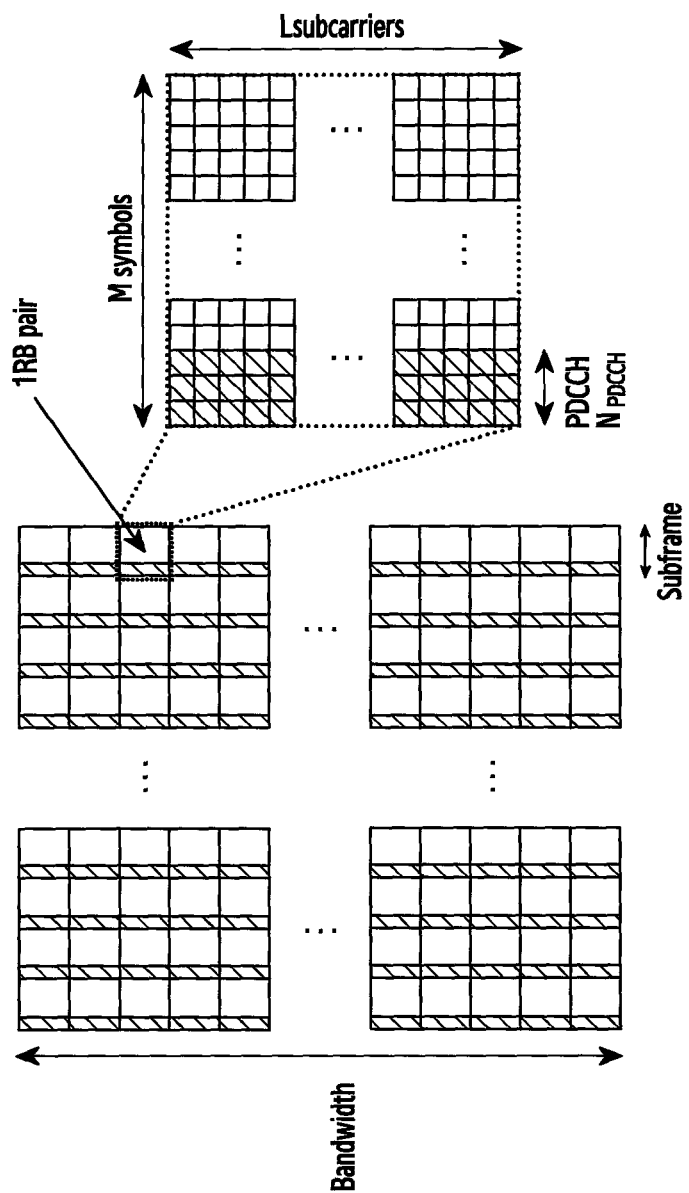
FIG. 2 is a reference diagram illustrating a Physical Downlink Control CHannel (PDCCH) control channel structure to be compared with the present invention.

FIG. 2 illustrates a PDCCH control channel structure to be compared with the present invention. The PDCCH occupies $N_{PUCCH}$-ary symbols (OFDM symbols) of M-ary symbols on the time axis within one subframe and uses the entire bandwidth on the frequency axis.

As the control channel for the D2D communication, the PDCCH control channel structure of the existing LTE system can be considered. A transmitter for transmitting CI in the downlink in the existing LTE system is the base station alone. Also, a receiver for receiving the CI transmitted in the uplink in the LTE system is the base station alone. However, a plurality of transmitters can transmit the CI and a plurality of receivers can receive the CI in the D2D communication. Accordingly, multiplexing the control channels transmitted by the D2D transmitters must be considered. When considering the distributed resource allocation in the D2D communication, there is no separate coordinator and thus multiplexing of the control channel may not be easy. In addition, when the D2D CI format B is selected as D2D CI, taking a separate physical control channel structure can cause considerable system overhead.

Figure 3:
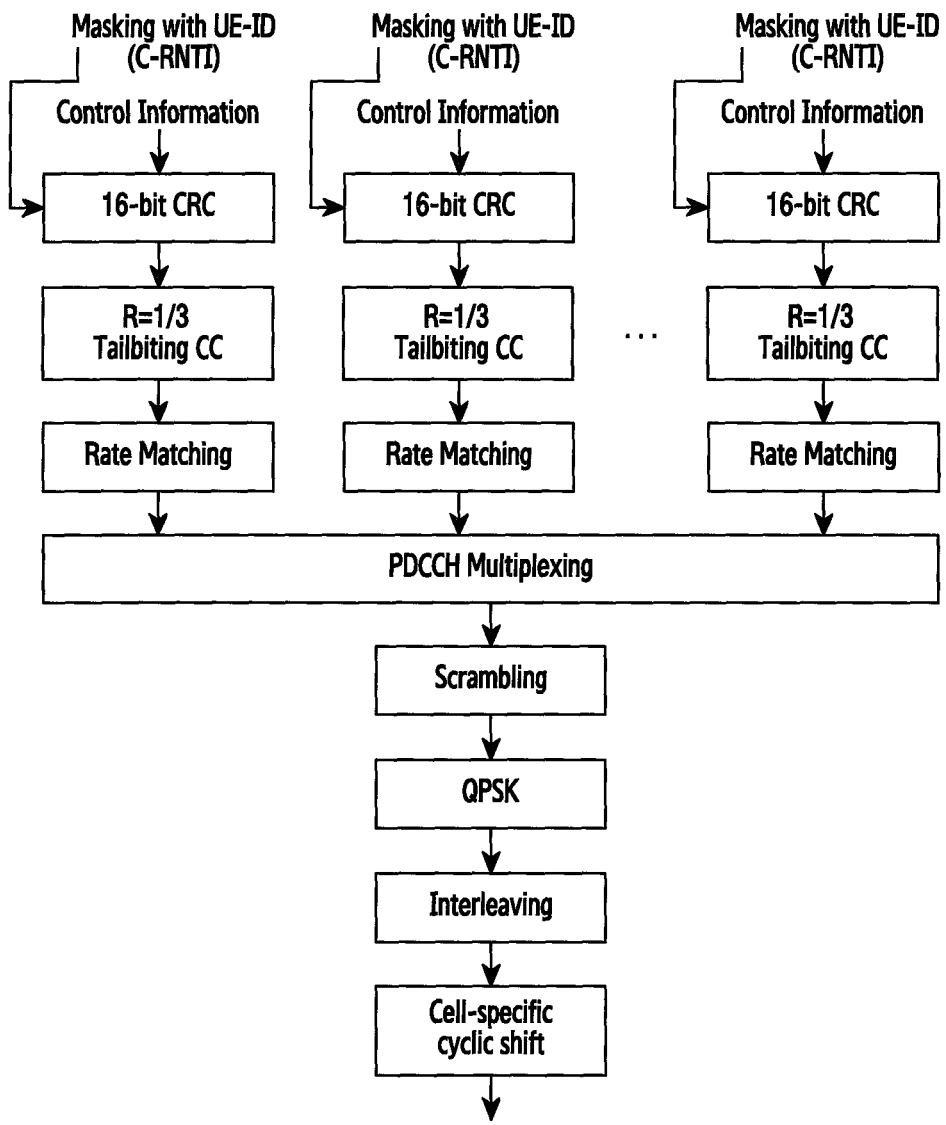
FIG. 3 is a reference diagram illustrating physical processing of PDCCH to be compared with the present invention.

FIG. 3 illustrates physical processing of PDCCH to be compared with the present invention. 16-bit CRC masked with the UE-ID (or C-RNTI) is added to CI generated from an upper layer. For example, assuming that the CI is X bits, X+16 bits are generated. The CI for each UE is encoded using a tail-biting convolution code of a coding rate 1/3 and multiplexed via the rate matching. For example, it is assumed that $b^{(i)}(0), \ldots, b^{(i)}(M_{bit}^{(i)}-1)$ denotes a bits sequence transmitted over PDCCH (i) or (UE (i)) within one subframe after the rating matching ends (e.g., to transmit $M_{bit}^{(i)}$). When the number of PDCCHs transmittable in one subframe is $n_{PDCCH}$, the following bits sequences are generated after the multiplexing.

$b^{(0)}(0), \ldots, b^{(0)}(M_{bit}^{(0)}-1), \ldots, b^{(n_{PDCCH})}(0), \ldots, b^{(n_{PDCCH})}(0)(M_{bit}^{(n_{PDCCH}-1)}-1)$ The generated bits sequences are scrambled through a cell-specific sequence in order to randomize inter-cell interference of the control channel. In particular, a scramble sequence generator at the start of each subframe is initialized to a value of the following Equation 5.

$$c_{init} = \left\lfloor \frac{n_s}{2} \right\rfloor \cdot 2^9 + N_{ID}^{cell} \qquad \text{[Equation 5]}$$

The scrambled bits sequences pass through the QPSK modulation, the interleaving, and the cell-specific cyclic shift, and then are mapped to resource elements.

Figure 4:
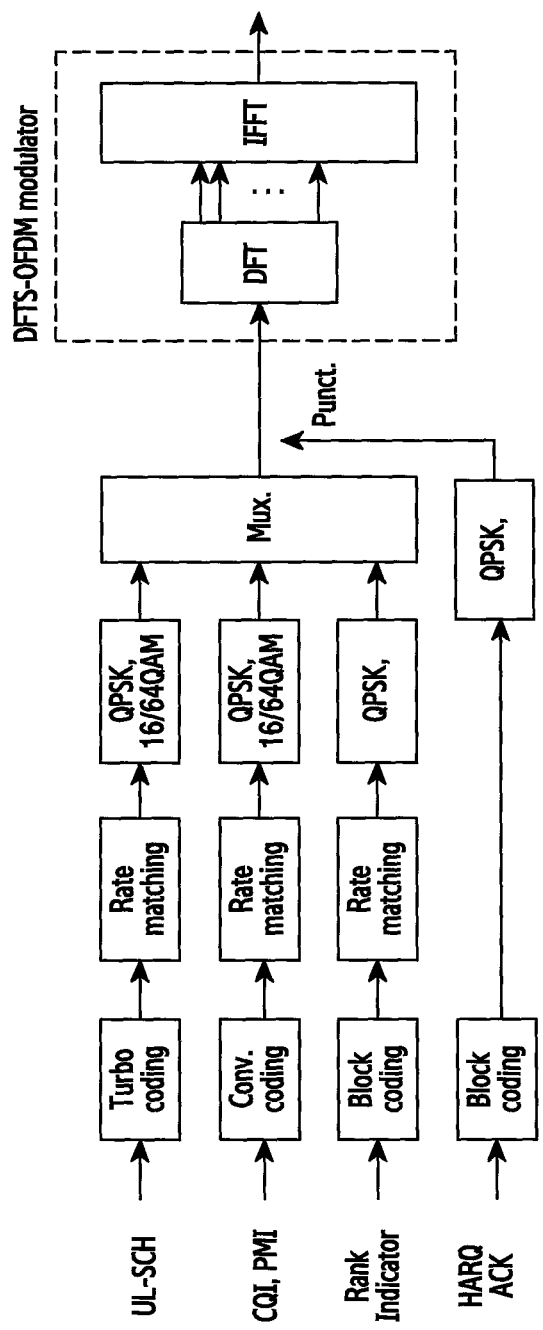
FIG. 4 is a reference diagram illustrating piggybacking control information on PUSCH to be compared with the present invention.

FIG. 4 illustrates piggybacking CI on PUSCH to be compared with the present invention. When the device can enable uplink PUSCH transmission in LTE/LTE-A (e.g., is allocated a resource for PUSCH transmission), CIs such as CQI, Precode Matrix Index (PMI), Rank Indicator (RI), and HARQ ACK can be fed back to the base station over the data channel (PUSCH). The CIs pass through the TDM with the data information (UL-SCH) and are fed as an input of SC-FDM.

Figure 5:
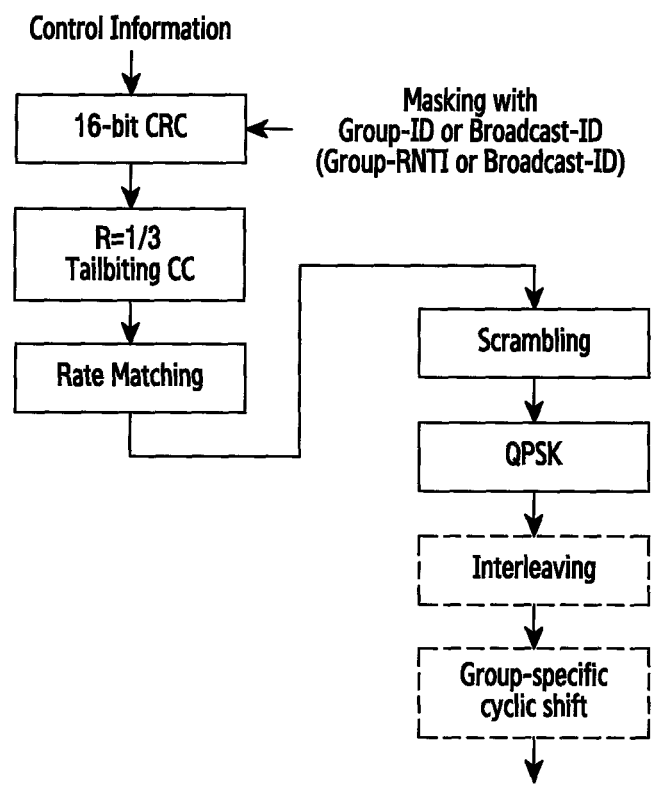
FIG. 5 is a reference diagram illustrating physical processing of a format A type of D2D Control Information (CI) through a PDCCH structure corresponding to an embodiment of the present invention.

FIG. 5 is a reference diagram illustrating physical processing of a format A type of D2D link CI over PDCCH corresponding to an embodiment of the present invention. 16-bit CRC masked with Group-ID (or Group-RNTI), Broadcast-ID (or Broadcast-RNTI) is added to the D2D CI generated from an upper layer. Group-ID is used for the groupcast communication, and Broadcast-ID is used for the broadcast communication. The CI is coded using the tail-biting convolution code of the coding rate 1/3, and scrambled through a group-specific scramble sequence, in order to randomize control channel interference between different groups via the rate matching. In particular, the scramble sequence generator at the start of each subframe is initialized to a value of the following Equation 6.

$$c_{init} = \left\lfloor \frac{n_s}{2} \right\rfloor \cdot 2^9 + N_{ID}^{group} \qquad \text{[Equation 6]}$$

The scrambled bits sequences pass through the QPSK modulation, the interleaving, and the group-specific cyclic shift, and then are mapped to resource elements.

Figure 6:
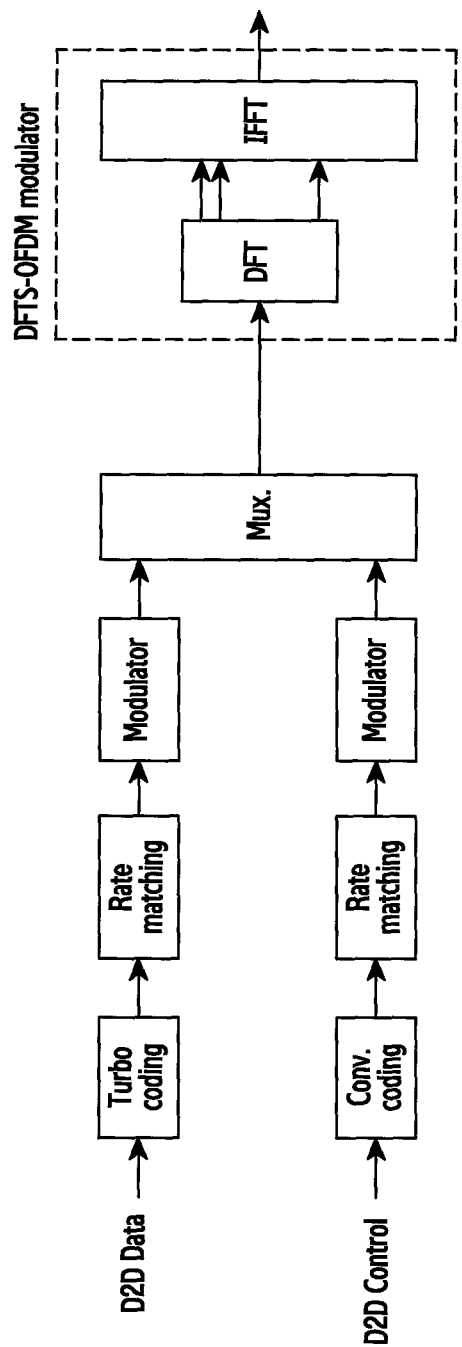
FIG. 6 is a reference diagram illustrating piggyback processing of format A and B types of D2D CI through a PUCCH structure corresponding to an embodiment of the present invention.

FIG. 6 is a reference diagram illustrating piggyback processing of format A and B types of D2D CI through PUCCH corresponding to an embodiment of the present invention. That is, FIG. 6 illustrates piggybacking the D2D CI format 1 or the D2D CI format B on the PUSCH. The DCD CI format 1 or the D2D CI format B passes through the TDM with the data information (UL-SCH) and is fed as an input of SC-FDM.

Figure 7:
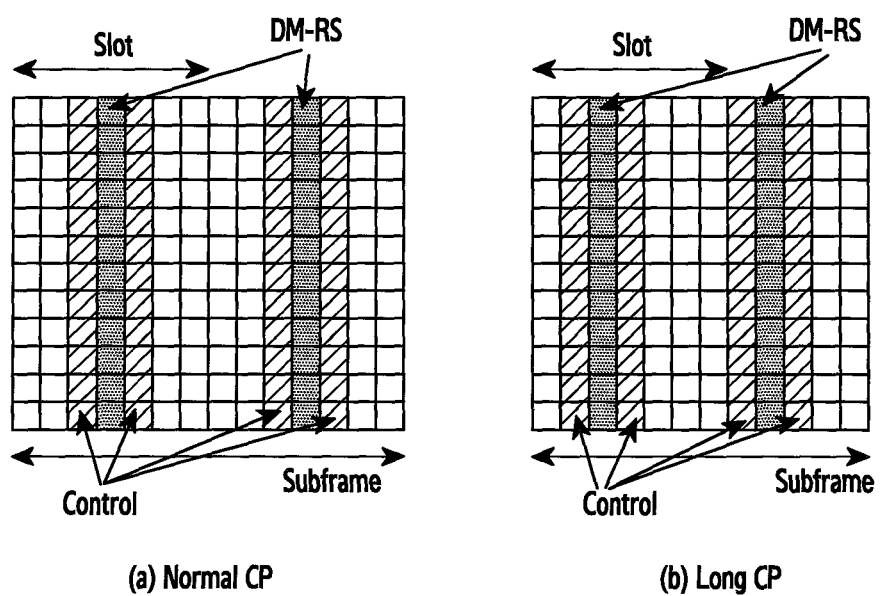
FIG. 7 is a reference diagram illustrating mapping a format A type of D2D CI of FIG. 6 to PUSCH.

FIG. 7 is a reference diagram illustrating mapping a format A type of D2D CI of FIG. 6 to PUSCH. That is, FIG. 7 illustrates mapping the TDM D2D CI and the data information generated in FIG. 6, to the PUSCH. To increase the reception reliability of the D2D CI, it is mapped to the left or the right of the DM-RS. FIG. 7A illustrates an example when normal Cyclic Prefix (CP) is used, and FIG. 7B illustrates an example when long CP is used.

Figure 8A:
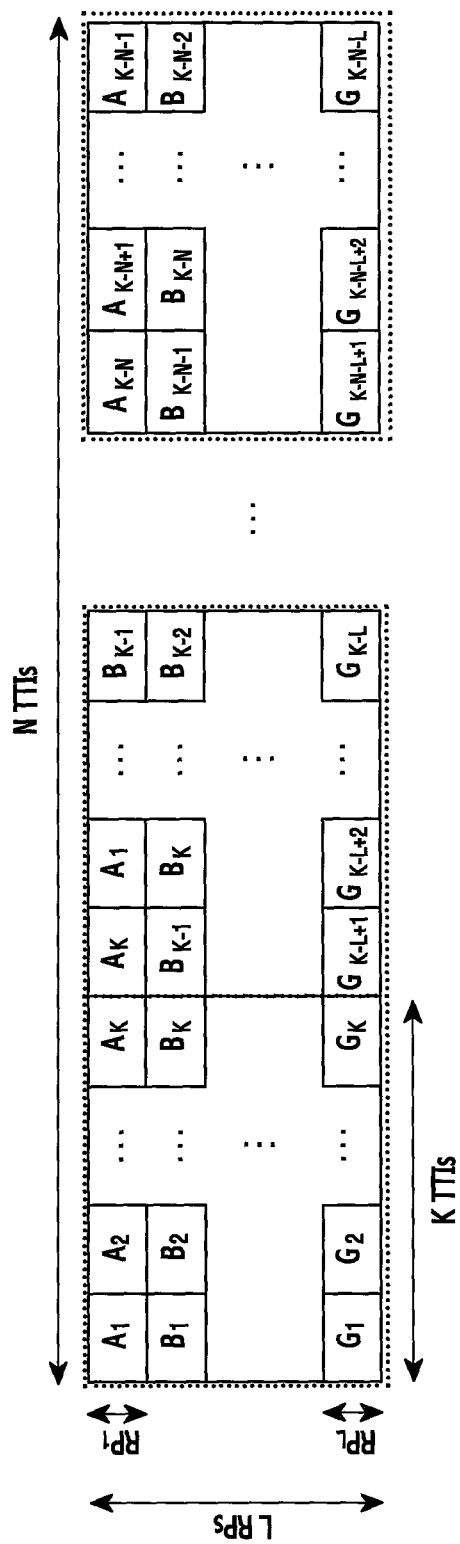
FIGS. 8A and 8B are reference diagrams illustrating a resource structure for resource allocation according to an embodiment of the present invention.

FIG. 8A is a reference diagram illustrating a resource structure for resource allocation according to an embodiment of the present invention. A bandwidth of the frequency axis includes L-ary Resource Pools (RPs), each RP is used by a predefined group, and a basic unit of an RP size is an RP pair including N-ary SC-FDM symbols on the time axis and M-ary subcarriers on the frequency axis. When using the normal CP, N=14 and M=12, and when using the long CP, N=12 and is M=12. The size of the RP can have various sizes depending on the number of the groups and the bandwidth. For example, assuming a B-RB in the bandwidth, when a predefined number of the groups is G, the size of each RP is the B/G RBs on the frequency domain. That is, the size of the RBs constituting each RP is identical. However, since information about the RP usable by each group can be predefined, the size of the RB in the RP usable by each group may differ.

Also, each RP has a predefined time shift pattern. For example, during a first K Transmission Time Interval (TTI) and a next K TTI, a resource block of RP1 is shifted once on the time axis and a resource block of RP2 is shifted twice on the time axis. A purpose of such a shift is to address a half-duplex problem. That is, when A1 transmits in the RP1 and B1 transmits in the RP2 during the K TTI, A1 and B2 cannot receive mutual signal. Hence, when different shifts are conducted in the next K TTI on the time axis, mutual signals can be received. For doing so, each D2D transmitter repeatedly transmits its data N times. Such repeated transmission of the data should transmit with NDI or RV CI in the transmitting stage so that the receiving stage can perform the CC or the IR. While the shift pattern is assumed to shift one at a time on the time axis between adjacent RPs in this example, there can be various shift patterns.

A transmitter to perform the broadcast communication, rather than the groupcast, can transmit the CI and the data information generated by the broadcast ID, rather than the group ID, in its RP. However, this method has disadvantages that the receiving stage needs to attempt decoding always using two IDs of the group ID and the broadcast ID and to attempt to decode all of the resources. Thus, specific RP(s) should be guaranteed to be used for the broadcast in the example of FIG. 8. For example, $RP_L$ can be used by only the transmitter desiring the broadcast communication, and a device which performs the groupcast communication has to always monitor its RP and $RP_L$.

Figure 8B:
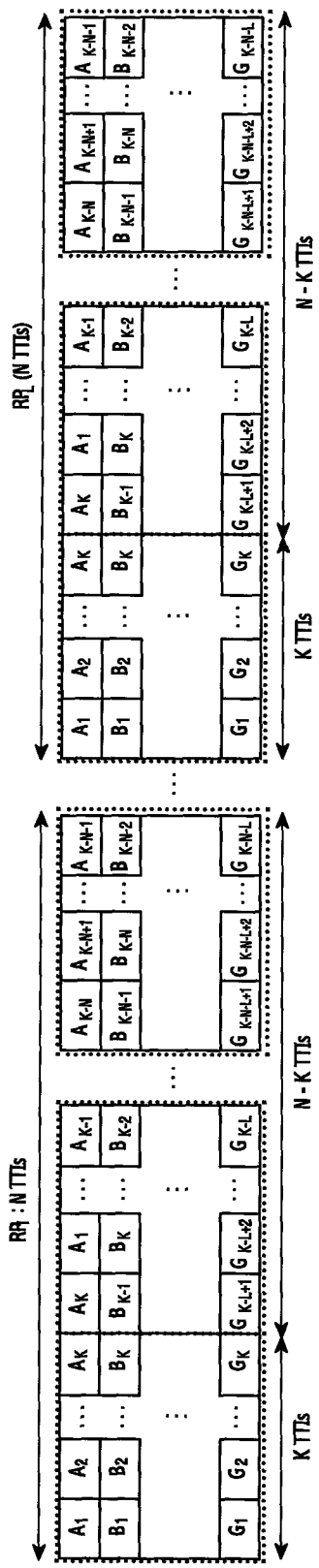

FIG. 8B is a reference diagram illustrating a resource structure for resource allocation according to another embodiment of the present invention. A difference from FIG. 8A lies in that RP per group is divided on the time axis. That is, RP1 for a group 1 lasts for N1 TTI, and then RP for a group 2 lasts for another N2 TTI. At this time, N1 and N2 may be operated identically or differently.

Meanwhile, to reduce power consumption of the receiving stage, the following operation is feasible. The receiving stage in each RP can receive and decode a signal during a first K TTI, and then switch to an idle mode during N-K TTI when information is not related to its group. For doing so, it is necessary to assume that all of group members are synchronized precisely and that system frame number/frame number are known. It can be assumed that the synchronization is fulfilled between devices over a separate synchronization channel and that every device receives the system frame number/frame number over a channel delivering separate system information. That is, like a Master Information Block (MIB) broadcast by the base station to devices in its managing cell, the transmission device needs to transmit the MIB.

After detecting a signal in the first K TTIs, when detecting information relating to its group or information relating to a group to communicate, not its own group, the receiving stage receives corresponding data during N-K TTIs without switching to the idle state.

Figure 9:
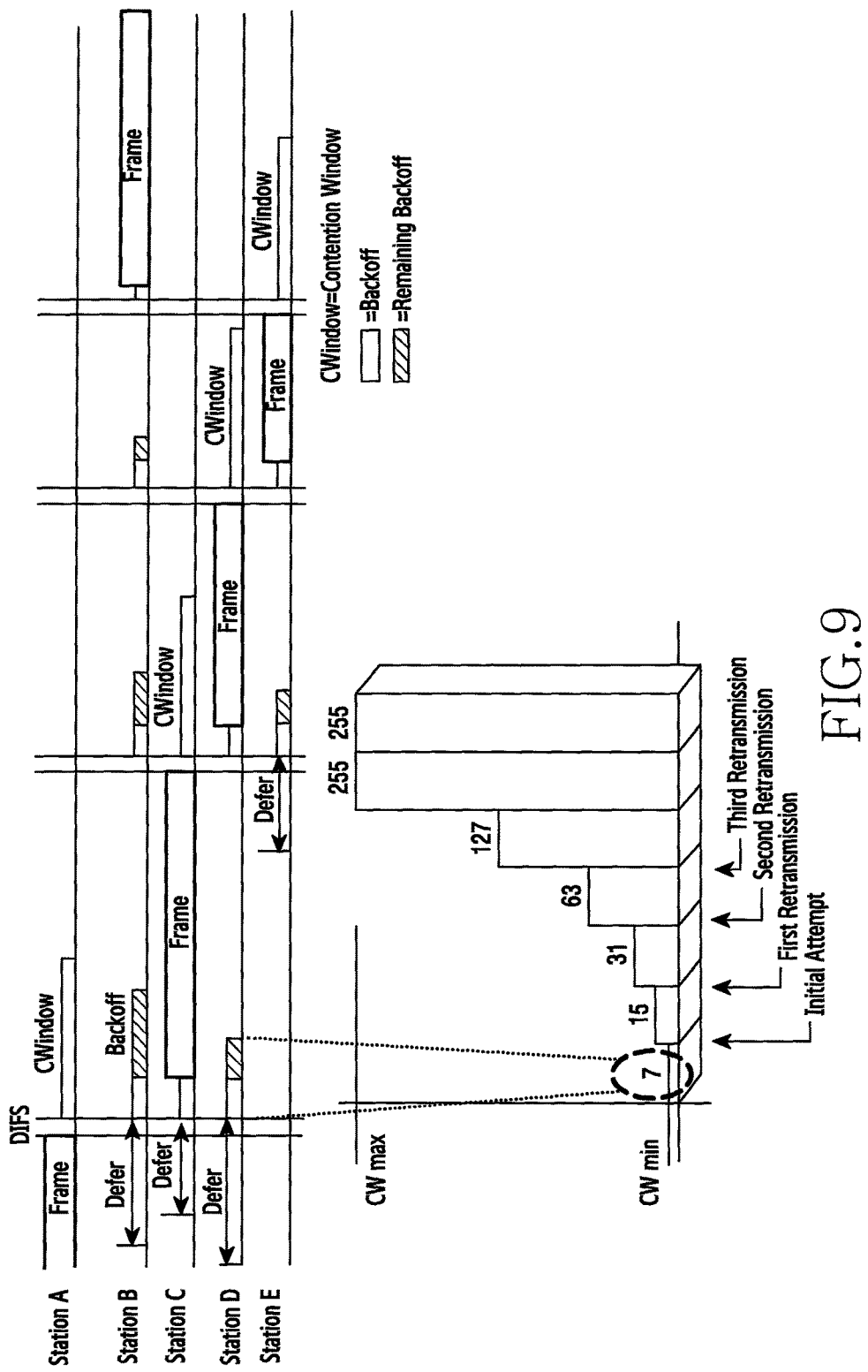
FIG. 9 is a reference diagram illustrating a random back-off operation in Wireless Fidelity (WiFi) to be compared with the present invention.

FIG. 9 is a reference illustrating a random back-off operation in WiFi to be compared with the present invention. WiFi operates in a contention window size (e.g., 8 or 16) of a default size, and when receiving NACK from the receiving stage, increases the contention window size (32, 64, 128, . . . ).

FIG. 10 is a reference illustrating random back-off operation based on a congestion level of D2D corresponding to an embodiment of the present invention. That is, FIG. 10 depicts a table for the back-off to prevent congestion in advance in the D2D. In FIG. 8, a D2D device desiring to transmit in RP of each group scans the energy level during K TTI (1 TTI=1 ms), selects the RB of the lowest energy level, and thus transmits in a next TTI (i.e., K+1 TTI). For example, when the RB of the lowest energy level measured for the K TTI in RP1 is A1, a corresponding device transmits data at resources corresponding to a position of A1 in the next K TTI. A device belonging to each group is assumed to know in advance the RP used by its group and the time shift pattern in the corresponding RP. However, after scanning during the K TTI, when transmitting in the next TTI right away, a probability that devices can transmit on the same resource increases and thus measures for preventing this in advance are demanded. Although the back-off in WiFi can be a similar manner, WiFi increases the contention window size when NACK occurs as shown in FIG. 9. Since the D2D communication does not have a separate feedback channel, the transmitting stage should determine its status and thus adjust the contention window size by itself.

Hence, in the present invention, after the energy sensing, the data transmission interval varies according to the congestion level determined by the device, rather than transmitting the data in the next interval. The congestion level can be defined as two levels of high/low, three levels of High/medium/low, or more than four levels of Level 1, Level 2, Level 3, Level 4, . . . . For example, the two levels can determine that the congestion level is low when the number of RBs having the energy level below a predefined threshold is greater than X or when the number of RBs having the energy level over the predefined threshold is smaller than X (on the contrary, the congestion level can be determined to be high). Also, the congestion level being low can be determined when the number of RBs having the energy level below the predefined threshold exceeds Y [%] of the whole RB or when the number of RBs having the energy level over the predefined threshold falls below Y [%] of the whole RB (on the contrary, the congestion level being high can be determined). Similarly, the congestion level more than three levels or four levels can be defined. In so doing, the transmission time corresponding to each congestion level is a value which should be defined as standard in advance.

Figure 11:
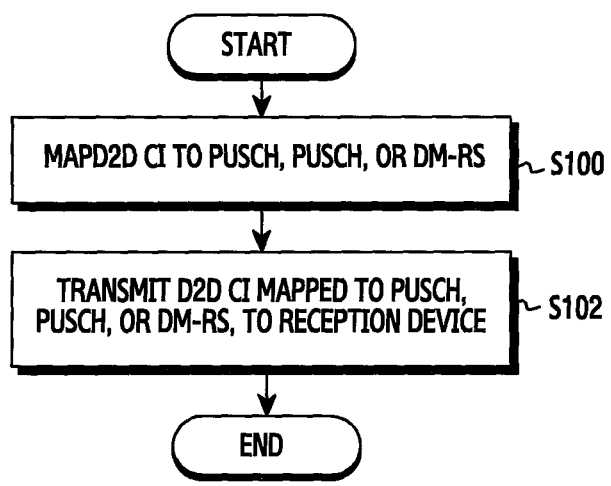
FIG. 11 is a flowchart of an embodiment to explain an operating method of a transmission device over resource allocation of D2D communication in a wireless communication according to the present invention.

FIG. 11 is a flowchart of an embodiment to explain an operating method of a transmission device over resource allocation of D2D communication in a wireless communication according to the present invention.

The transmission device maps D2D CI for the D2D communication to at least one of PDCCH, PUSCH, and DM-RS (S100).

After step S100, the transmission device transmits the D2D CI mapped to at least one of the PDCCH, the PUSCH, and the DM-RS to a reception device for the D2D communication (S102)

Figure 12:
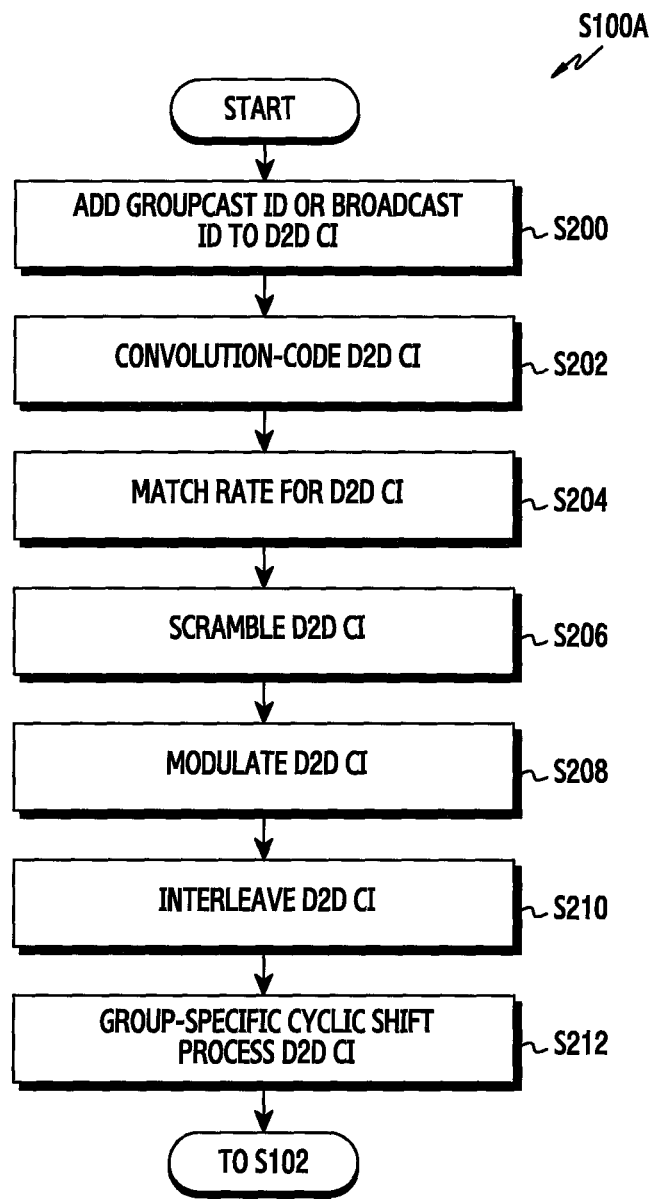
FIG. 12 is a flowchart of an embodiment to explain a process for mapping D2D CI of FIG. 11.

FIG. 12 is a flowchart of an embodiment for explaining a process of mapping D2D CI of FIG. 11. FIG. 12 illustrates the mapping process in a case where the D2D CI is mapped to symbols of the PDCCH. At this time, the D2D CI mapped to the symbols of the PDCCH can include resource block assignment information, MCS information, redundancy version information, new data indicator information, and cyclic shift information for DM-RS and OCC index information.

First, the transmission device adds at least one of a groupcast ID and a broadcast ID of a group defining a range of the D2D communication to the D2D CI (S200). When adding the groupcast ID or the broadcast ID to the D2D CI, the transmission device adds CRC masked with the groupcast ID or the broadcast ID, to the D2D CI. Since the D2D communication is performed by using groupcasting or broadcasting, 16-bit CRC masked with the groupcast ID (or Group-RNTI) or the broadcast ID (or Broadcast-RNTI) newly defined in the 16-bit CRC added to the CI is added to the D2D CI.

After step S200, the transmission device convolution-codes the D2D CI added with the groupcast ID or the broadcast ID (S202). The D2D CI can be coded using the tail-biting convolution code of the coding rate 1/3.

After S202, the transmission device matches the rate for the convolution-coded D2D CI (S204).

After S204, the transmission device scrambles the rate-matched D2D CI using the groupcast ID or the broadcast ID (S206). The present invention needs to adopt the group specific scrambling. To randomize the interference of the control channel between different groups, the rate-matched D2D CI is scrambled through the group-specific scramble sequence. In particular, it is initialized to the value of Equation 6 at the start of each subframe. Each group uses a predefined group unique ID.

After step S206, the transmission device modulates the scrambled D2D CI (S208). The D2D CI can perform the QPSK modulation as an example of the modulation scheme.

After step S208, the transmission device interleaves the modulated D2D CI (S210).

After step S210, the transmission device processes the group-specific cyclic shift on the interleaved D2D CI (S212). Through the group-specific cyclic shift, it is mapped to the resource elements.

Figure 13:
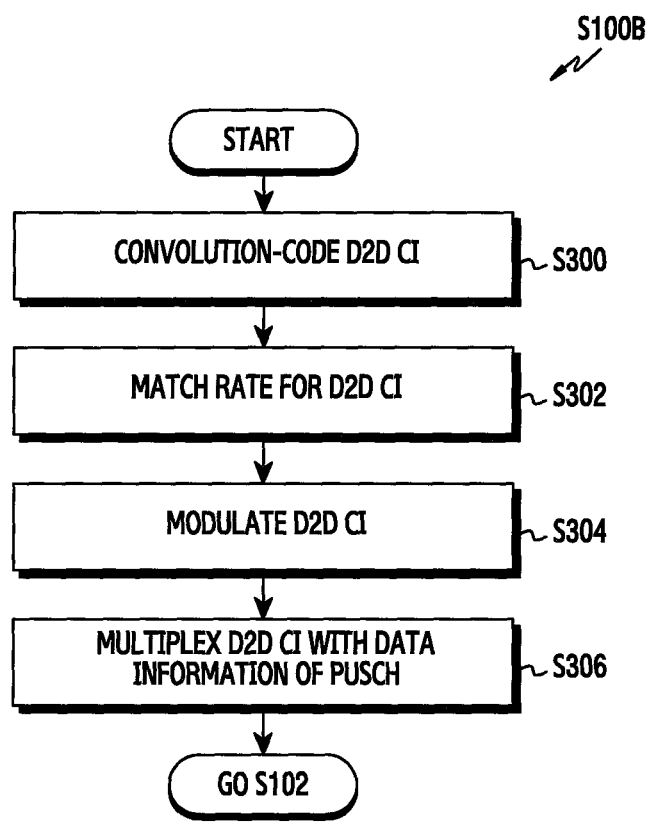
FIG. 13 is a flowchart of another embodiment to explain a process for mapping D2D CI of FIG. 11.

FIG. 13 is a flowchart of another embodiment to explain a process for mapping D2D CI of FIG. 11. FIG. 13 illustrates the mapping process in a case where the D2D CI is mapped to symbols of the PUSCH. At this time, the D2D CI mapped to symbols of PUSCH can include resource block assignment information, MCS information, redundancy version information, new data indicator information, and cyclic shift information for DM-RS and OCC index information. Also, the D2D CI mapped to the symbols of the PUSCH may include only the new data indicator information corresponding to one bit.

First, when mapping the D2D CI to the symbols of the PUSCH, the transmission device convolution-codes the D2D CI (S300). After step S300, the transmission device matches the rate for the convolution-coded D2D CI (S302). After step S302, the transmission device modulates the rate-matched D2D CI (S304).

After S304, the transmission device multiplexes the modulated D2D CI with modulated data information of the PUSCH (S306). When multiplexing the D2D CI with the data information, the transmission device maps to symbols closest to the DM-RS of the PUSCH. Mapping the D2D CI to the symbols of the PUSCH is to perform piggyback processing on format A and B types of the D2D CI through the above-mentioned PUSCH of FIG. 6. Hence, the format A or the format B of the D2D CI passes through the TDM with the data information (UL-SCH) and is fed as an input of SC-FDM. In so doing, to increase the reception reliability of the D2D CI, it is mapped to the left or the right of the DM-RS.

Meanwhile, yet another embodiment for mapping the D2D control information may directly map the D2D CI to the DM-RS. In so doing, the transmission device maps the new data indicator information as the D2D CI mapped to the DM-RS.

Since the type and the size of the CI vary in the existing cellular communication, the DM-RS cannot carry information. Since the format B of the D2D CI can transmit only the new data indicator information corresponding to 1 bit information, it is possible to transmit the D2D CI through the DM-RS.

To carry and transmit 1 bit information of the new data indicator corresponding to the D2D CI on the DM-RS, the following two predefined parameter values can be used.

When NDI=0 (repetition), $n_{DMRS,\lambda}^{(2)}=0$, $[w^{(\lambda)}(0)\ w^{(\lambda)}(1)]=[1\ 1]$, When NDI=1 (new data), $n_{DMRS,\lambda}^{(2)}=6$, $[w^{(\lambda)}(0)\ w^{(\lambda)}(1)]=[1\ -1]$, The above values are exemplary, and two arbitrary fixed values can be used. Since the receiving stage does not know which value of the two parameters is used to transmit the DM-RS, a final value is determined after performing detection on every case.

Figure 14:
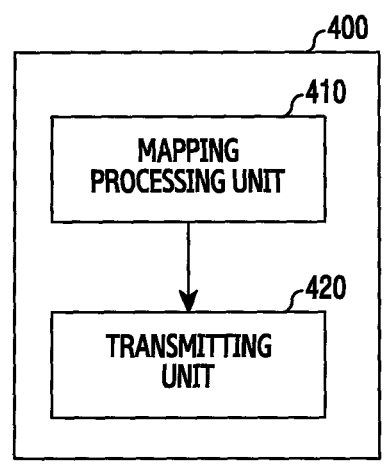
FIG. 14 is a block diagram of an embodiment to explain an operating apparatus of a transmission device over resource allocation of D2D communication in a wireless communication according to the present invention.

FIG. 14 is a block diagram of an embodiment to explain an operating apparatus 400 of a transmission device over resource allocation of D2D communication in a wireless communication according to the present invention, and includes a mapping processing unit 410 and a transmitting unit 420.

The mapping processing unit 410 maps the D2D CI for the D2D communication to at least one of the PDCCH, the PUSCH, and the DM-RS, and sends a mapping result to the transmitting unit 420.

The transmitting unit 420 transmits the D2D CI mapped to at least one of the PDCCH, the PUSCH, and the DM-RS to the reception device. For doing so, the transmitting unit 420 includes a wireless communication module for interfacing wireless communication with the reception device.

Figure 15:
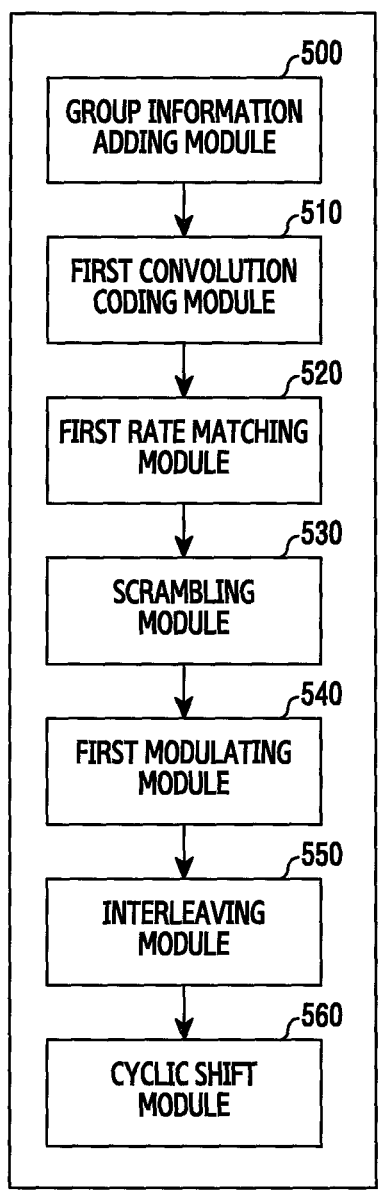
FIG. 15 is a block diagram of an embodiment to explain a mapping processing unit of FIG. 14.

FIG. 15 is a block diagram of an embodiment to explain a mapping processing unit 410 of FIG. 14, and is a block diagram 410A when the D2D CI is mapped to symbols of PDCCH. For doing so, the mapping processing unit 410 includes a group information adding module 500, a first convolution coding module 510, a first rate matching module 520, a scrambling module 530, a first modulating module 540, an interleaving module 550, and a cyclic shift module 560.

When mapping the D2D CI to the symbols of the PDCCH, the group information adding module 500 adds the groupcast ID or the broadcast ID of the group defining the range of the D2D communication to the D2D CI, and sends the CI added with the groupcast ID or the broadcast ID to the first convolution coding module 510. The group information adding module 500 adds CRC masked with the groupcast ID or the broadcast ID, to the D2D CI.

In so doing, the D2D CI mapped to the symbols of the PDCCH includes the resource block assignment information, the MCS information, the redundancy version information, the new data indicator information, and the cyclic shift information for the DM-RS and the OCC index information.

The first convolution coding module 510 convolution-codes the D2D CI added with the groupcast ID or the broadcast ID, and sends the convolution-coded D2D CI to the first rate matching module 520. The first convolution coding module 510 can code the D2D CI using the tail-biting convolution code of the coding rate 1/3.

The first rate matching module 520 matches the rate for the convolution-coded D2D CI, and sends the rate-matched D2D CI to the scrambling module 530.

The scrambling module 530 scrambles the rate-matched D2D CI using the groupcast ID or the broadcast ID, and sends the scrambled D2D CI to the first modulating module 540. To randomize interference of a control channel between different groups, the scrambling module 530 scrambles the rate-matched D2D CI through a group-specific scramble sequence.

The first modulating module 540 modulates the scrambled D2D CI and sends the modulated D2D CI to the interleaving module 550. The first modulating module 540 can perform the QPSK modulation on the D2D CI as an example of the modulation scheme.

The interleaving module 550 interleaves the modulated D2D CI, and sends the interleaved D2D CI to the cyclic shift module 560.

The cyclic shift module 560 group-specific cyclic shifts the interleaved D2D CI.

Figure 16:
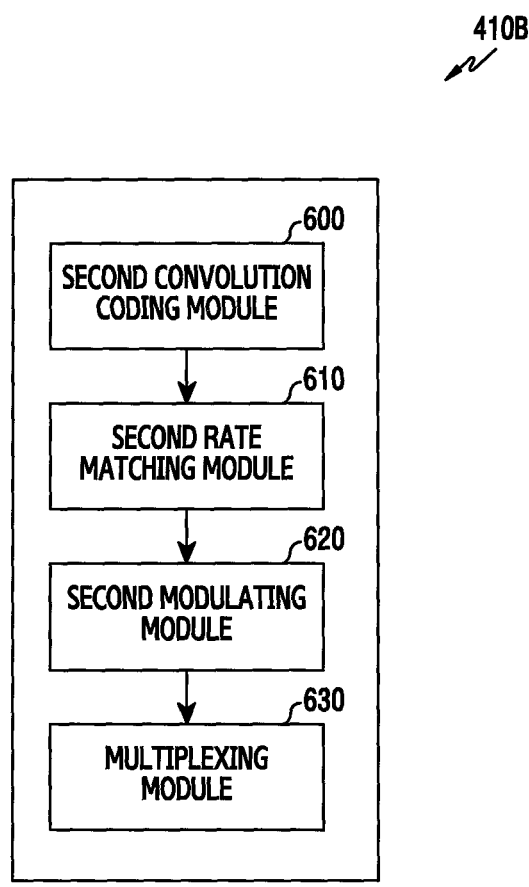
FIG. 16 is a block diagram of another embodiment to explain a mapping processing unit of FIG. 14.

FIG. 16 is a block diagram of another embodiment to explain a mapping processing unit of FIG. 14, and is a block diagram 410B when the D2D CI is mapped to the symbols of PUSCH. For doing so, the mapping processing unit 410 includes a second convolution coding module 600, a second rate matching module 610, a second modulating module 620, and a multiplexing module 630. At this time, the D2D CI mapped to the symbols of the PUSCH can include resource block assignment information, MCS information, redundancy version information, new data indicator information, and cyclic shift information for DM-RS and OCC index information. Also, the D2D CI mapped to the symbols of the PUSCH may include only the new data indicator information corresponding to 1 bit.

When mapping the D2D CI to the symbols of the PUSCH, the second convolution coding module 600 convolution-codes the D2D CI,\ and sends the convolution-coded D2D CI to the second rate matching module 610.

The second rate matching module 610 matches the rate for the convolution-coded D2D CI, and sends the rate-matched D2D CI to the second modulating module 620.

The second modulating module 620 modulates the rate-matched D2D CI and sends the modulated D2D CI to the multiplexing module 630.

The multiplexing module 630 multiplexes the modulated D2D CI with the modulated data information of the PUSCH.

The multiplexing module 630 maps the D2D CI to symbols closest to DM-RS of the PUSCH. To increase reception reliability of the D2D CI, the multiplexing module 630 maps the D2D CI to the left or the right of the DM-RS.

Meanwhile, when mapping the D2D CI to the DM-RS, the mapping processing unit 410 may map the new data indicator information as the D2D CI. In so doing, the mapping processing unit 410 uses a parameter value of a 1-bit size as the new data indicator information. Since the format B of the D2D CI carries only the new data indicator information corresponding to 1 bit information, it is possible to transmit the D2D CI through the DM-RS. To carry and transmit the 1 bit information of the new data indicator corresponding to the D2D CI on the DM-RS, the two predefined parameter values can be used. Since the reception device does not know which value of the two parameters is used to transmit the DM-RS, a final value is determined after performing detection on every case.

Figure 17:
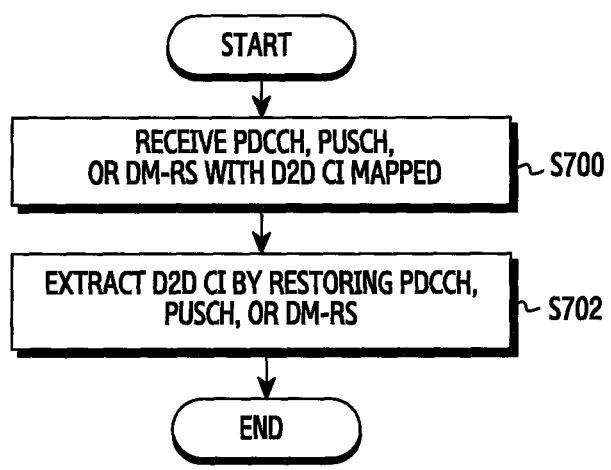
FIG. 17 is a flowchart of an embodiment to explain an operating method of a reception device over resource allocation of D2D communication in a wireless communication according to the present invention.

FIG. 17 is a flowchart of an embodiment to explain an operating method of a reception device through resource allocation of D2D communication in a wireless communication according to the present invention.

When D2D CI is mapped to at least one of PDCCH, PUSCH, and DM-RS and transmitted from the transmission device for the D2D communication, at least one of the PDCCH, the PUSCH, and the DM-RS mapped to the D2D CI is received (S700).

After step S700, the D2D CI is extracted by restoring at least one of the received PDCCH, PUSCH, and DM-RS (S702).

When the D2D CI is mapped to the symbols of the PDCCH and received, at least one of a groupcast ID and a broadcast ID for a group defining a range of the D2D communication is extracted from the symbols of the PDCCH. To extract the D2D CI from the symbols of the PDCCH, the D2D CI is extracted by restoring data in an inverse order of the above-mentioned PDCCH mapping process of FIG. 5.

When the D2D CI is mapped to symbols of the PUSCH and received, the D2D CI is extracted by demultiplexing from modulated data information of the PUSCH. To extract the D2D CI from the symbols of the PUSCH, the D2D CI is extracted by restoring data in an inverse order of the above-mentioned PUSCH mapping process of FIG. 6.

Also, when the D2D CI is mapped to the DM-RS and received, the new data indicator information is extracted as the D2D CI. In so doing, the 1-bit new data indicator information is extracted as the D2D CI using two parameter values. Since which value of the two parameters the DM-RS including the D2D CI has is unknown, a final value is determined after performing detection on every case.

Figure 18:
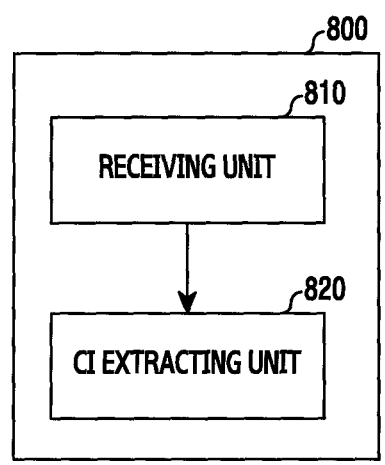
FIG. 18 is a block diagram of an embodiment to explain an operating apparatus of a reception device over resource allocation of D2D communication in a wireless communication according to the present invention.

FIG. 18 is a block diagram of an embodiment to explain an operating apparatus of a reception device over resource allocation of D2D communication in a wireless communication according to the present invention, and includes a receiving unit 810 and a CI extracting unit 820.

When D2D CI for the D2D communication is mapped to at least one of PDCCH, PUSCH, DM-RS and transmitted, the receiving unit 810 receives the PDCCH, the PUSCH, or the DM-RS mapped with the D2D CI, from the transmission device. For doing so, the receiving unit 810 includes a wireless communication module for interfacing wireless communication with the transmission device.

The CI extracting unit 820 extracts the D2D CI by restoring at least one of the received PDCCH, PUSCH, and DM-RS.

When the D2D CI is mapped to symbols of the PDCCH and received, the CI extracting unit 820 extracts at least one of a groupcast ID and a broadcast ID about a group defining a range of the D2D communication from the symbols of the PDCCH. To extract the D2D CI from the symbols of the PDCCH, the CI extracting unit 820 extracts the D2D CI by restoring data in an inverse order of the PDCCH mapping process.

Also, when the D2D CI is mapped to symbols of the PUSCH and received, the CI extracting unit 820 extracts the D2D CI by demultiplexing from modulated data information of the PUSCH. To extract the D2D CI from the symbols of the PUSCH, the CI extracting unit 820 extracts the D2D CI by restoring data in an inverse order of the PUSCH mapping process.

Also, when the D2D CI is mapped to the DM-RS and received, the CI extracting unit 820 extracts new data indicator information as the D2D CI. In so doing, the CI extracting unit 820 extracts 1-bit new data indicator information as the D2D CI using two parameter values. Since the CI extracting unit 820 does not know which value of the two parameters the DM-RS including the D2D CI has, it determines a final value after performing detection on every case.

Figure 19:
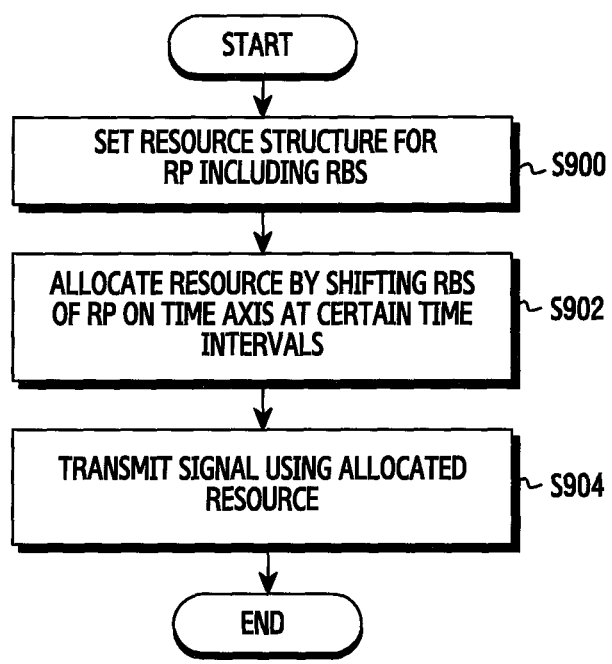
FIG. 19 is a flowchart of an embodiment to explain an operating method of a transmission device over resource allocation of D2D communication in a wireless communication according to the present invention.

FIG. 19 is a flowchart of an embodiment to explain an operating method of a transmission device over resource allocation of D2D communication in a wireless communication according to the present invention.

A resource structure is set to include at least one or more resource pool having a plurality of RBs based on a certain time (S900). As shown in FIG. 8A described above, the bandwidth of the frequency axis includes the L-ary RPs, and each RP is used by a predefined group. The basic unit of the size of each RP is the RP pair including N-ary SC-FDM symbols on the time axis and M-ary subcarriers on the frequency axis. When using the normal CP, N=14 and M=12, and when using the long CP, N=12 and is M=12. The size of the RP can have a variety of sizes depending on the number of the groups and the bandwidth. For example, assuming a B-RB in the bandwidth, when a predefined number of the groups is G, the size of each RP is the B/G RBs on the frequency domain. That is, the size of the RBs constituting each RP is identical.

Also, as shown in FIG. 8B, each RP per group is divided on the time axis. That is, N1 TTI is set as the RP1 for the group 1, and another N2 TTI is set as the RP2 for the group 2.

After step S900, a resource for a signal to transmit is allocated by shifting the RBs of the RP on the time axis at an interval of the certain time (S902). The process for shifting the RBs on the time axis shifts the RBs such that a shift interval of the RP is different from a shift interval of another RP.

Each of the RPs has a predefined time shift pattern. For example, as shown in FIG. 8A, during the first K TTI and the next K TTI RP1, the RB of the RP1 is shifted once on the time axis and the RB of the RP2 is shifted twice on the time axis. The purpose of this shift is to address the half-duplex problem. That is, when A1 transmits in the RP1 and B1 transmits in the RP2 during the K TTI, A1 and B2 cannot receive mutual signal. Hence, when different shifts are conducted on the time axis in the next K TTI, mutual signal can be received. For doing so, each D2D transmission device repeatedly transmits its data N times. Such repeated transmission of the data should transmit with the NDI or the RV CI in the transmission device so that the reception device can perform the CC or the IR. While the shift pattern is assumed to shift one at a time on the time axis between adjacent RPs in this example, there can be various shift patterns. Meanwhile, a transmission device to perform the broadcast communication, instead of the groupcast, can transmit CI and data information generated with the broadcast ID, rather than the group ID, in its RP. When the broadcast communication is conducted, the reception device needs to decode always using two IDs of the group ID and the broadcast ID and attempts to decode every resource. Thus, a specific RP should be guaranteed to be used for the broadcast in the example of FIG. 8. For example, $RP_L$ can be used by only a transmitter desiring the broadcast communication, and a reception device which performs the groupcast communication always monitors its RP and $RP_L$ conducting the broadcast communication.

Meanwhile, when an interval where the certain time is added up for a certain number of times is a unit period, the resource may be allocated by grouping per unit period. As shown in FIG. 8B, when an example of the unit period is N1 TTI or N2 TTI, when each RP per group is divided on the time axis, the RP1 for the group 1 is allocated during N1 TTI and next the RP2 for the group 2 is allocated during another N2 TTI. In so doing, N1 and N2 may be in the same size and be operated differently.

After step S902, the signal is transmitted to the reception device using the allocated resource (S904).

Figure 20:
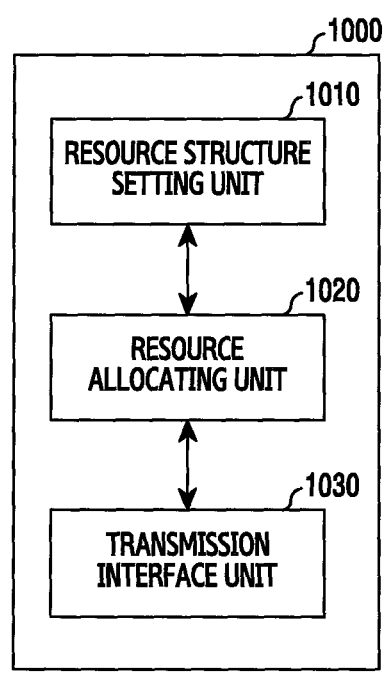
FIG. 20 is a block diagram of an embodiment to explain an operating apparatus of a transmission device over resource allocation of D2D communication in a wireless communication according to the present invention.

FIG. 20 is a block diagram of an embodiment 1000 to explain an operating apparatus of a transmission device over resource allocation of D2D communication in a wireless communication according to the present invention, and includes a resource structure setting unit 1010, a resource allocating unit 1020, and a transmission interface unit 1030.

The resource structure setting unit 1010 sets a resource structure to include at least one or more RP having a plurality of RBs based on a certain time. As shown in FIG. 8A, the resource structure setting unit 1010 constructs L-ary RPs based on a frequency axis, and each RP is defined to be used by a predefined group. The resource structure setting unit 1010 sets the RB pair having N-ary SC-FDM symbols on the time axis and M-ary subcarriers on the frequency axis as one RP, and constructs the resource structure with such RPs. Also, as shown in FIG. 8B, the resource structure setting unit 1010 divides each RP per group on the time axis, sets as the RP1 for the group 1 during N1 TTI, and sets as the RP2 for the group 2 during another N2 TTI.

The resource allocating unit 1020 allocates a resource for a transmit signal by shifting the RBs of the RP on the time axis at the interval of the certain time. The resource allocating unit 1020 shifts the RBs such that the shift interval of the RP is different from the shift interval of another RP.

The resource allocating unit 1020 has a predefined time shift pattern for the RPs respectively. For example, as shown in FIG. 8A, during a first K TTI (1 TTI=1 ms) and a next K TTI RP1, the resource allocating unit 1020 shifts the RB of the RP1 once on the time axis and shifts the RB of the RP2 twice on the time axis. Thus, when different shifts are conducted on the time axis in the next K TTI, mutual signals can be received. While the shift pattern for shifting the adjacent RPs one at a time on the time axis in this example, there can be various shift patterns.

Also, when the interval where the certain time is added up for a certain number of times is a unit period, the resource allocating unit 1020 may allocate the resource by grouping per unit period. As shown in FIG. 8B, when an example of the unit period is N1 TTI or N2 TTI, when each RP per group is divided on the time axis, the RP1 for the group 1 is allocated during N1 TTI and next the RP2 for the group 2 is allocated during another N2 TTI. In so doing, the resource allocating unit 1020 may allocate N1 and N2 in the same size and operate differently.

Hence, the transmission interface unit 1030 transmits the signal using the allocated resource.

An apparatus for operating a transmission device over resource allocation of D2D communication in a wireless communication system can include a mapping processing unit for mapping D2D control information for the D2D communication to at least one of a Physical Downlink Control CHannel (PDCCH), a Physical Uplink Shared CHannel (PUSCH), and Demodulation-Reference Signals (DM-RS); and a transmitting unit for transmitting the D2D control information mapped to at least one of the PDCCH, the PUSCH, and the DM-RS, to a reception device.

The mapping processing unit further includes a group information adding module for, when mapping the D2D control information to symbols of the PDCCH, adding at least one of a groupcast ID and a broadcast ID of a group which defines a range of the D2D communication, to the D2D control information, and the D2D control information added with the groupcast ID or the broadcast ID can be mapped to the symbols of the PDCCH.

The D2D control information can include one or more of resource block assignment information, MCS information, redundancy version information, new data indicator information, and cyclic shift information for DM-RS and OCC index information.

The group information adding module can add CRC masked with one of the groupcast ID and the broadcast ID, to the D2D control information.

The mapping processing unit can include a first convolution coding module for convolution-coding the D2D control information added with the groupcast ID or the broadcast ID; a first rate matching module for matching a rate for the convolution-coded the D2D control information; a scrambling module for scrambling the rate-matched D2D control information using one of the groupcast ID and the broadcast ID; a first modulating module for modulating the scrambled D2D control information; an interleaving module for interleaving the modulated D2D control information; and a cyclic shift module for group-specific cyclic shifting the interleaved D2D control information.

The mapping processing unit can include a second convolution module for, when mapping the D2D control information to symbols of the PUSCH, convolution-coding the D2D control information; a second rate matching module for matching a rate for the convolution-coded the D2D control information; a second modulating module for modulating the rate-matched D2D control information; and a multiplexing module for multiplexing the modulated D2D control information with modulated data information of the PUSCH.

The D2D control information can include one or more of resource block assignment information, MCS information, redundancy version information, new data indicator information, and cyclic shift information for DM-RS and OCC index information.

The multiplexing module can map the D2D control information to symbols closest to DM-RS of the PUSCH.

When mapping the D2D control information to the DM-RS, the mapping processing unit can map new data indicator information as the D2D control information.

The mapping processing unit can use a parameter value having a 1-bit size as the new data indicator information.

In various embodiments, an apparatus for operating a reception device over resource allocation of D2D communication in a wireless communication system can include a receiving unit for, when D2D control information for the D2D communication is mapped to at least one of a PDCCH, a PUSCH, and DM-RS and transmitted, receiving at least one of the PDCCH, the PUSCH, and the DM-RS to which the D2D CI is mapped; and a control information extracting unit for extracting the D2D control information by restoring at least one of the PDCCH, the PUSCH, and the DM-RS received.

When the D2D control information is mapped to symbols of the PDCCH and received, the control information extracting unit can extract at least one of a groupcast ID and a broadcast ID of a group defining a range of the D2D communication from the D2D control information.

When the D2D control information is mapped to symbols of the PUSCH and received, the control information extracting unit can extract the D2D control information by demultiplexing from modulated data information of the PUSCH.

When the D2D control information is mapped to the DM-RS and received, the control information extracting unit can extract new data indicator information as the D2D control information.

The control information extracting unit can extract the new data indicator information can extract using a 1-bit parameter value.

In various embodiments, an apparatus for operating a reception device over resource allocation of D2D communication in a wireless communication system can includes a resource structure setting unit for, an apparatus for operating a transmission device over resource allocation of D2D communication in a wireless communication system can include a resource structure setting unit for setting a resource structure to include at least one or more resource pool having a plurality of resource blocks based on a certain time; a resource allocating unit for allocating a resource for a signal to transmit by shifting the resource blocks of the resource pool on a time axis at an interval of the certain time; and a transmission interface unit for transmitting the signal to a reception device using the allocated resource.

The resource allocating unit can shift the resource blocks such that a shift interval of resource pool is different from a shift interval of another resource pool.

When an interval where the certain time is added up for a certain number of times is a unit period, the resource allocating unit can allocate a resource allocated by grouping per unit period.

In various embodiments, an apparatus for operating a reception device over resource allocation of D2D communication in a wireless communication system can include a reception interface unit for interfacing reception of a signal transmitted from a transmission device; a control unit for, when a resource for a signal is allocated according to a resource structure including at least one or more resource pool having a plurality of resource blocks based on a certain time, controlling to receive the signal from the transmission device through the allocated resource; and a decoder for decoding the received signal.

When an interval where the certain time is added up for a certain number of times is a unit period, the allocated resource can be allocated by grouping per unit period.

The control unit can determine whether the signal is information relating to its group when the signal is transmitted through the resource allocated by grouping per unit period, and control to receive the signal when the signal corresponds to the information relating to its group.

When receiving system frame information indicating information about a resource allocated by grouping per unit period from the transmission device, the control unit can determine whether the signal is the information relating to its group using the system frame information.

When the signal is transmitted through the resource allocated by grouping per unit period, the control unit can control to switch to a standby mode when the signal is not the information relating to its group.

In various embodiments an apparatus for operating a transmission device over resource allocation of D2D communication in a wireless communication system includes a signal receiving unit for receiving signals for the D2D communication during a certain time; an energy level detecting unit for detecting energy levels of resource blocks respectively corresponding to the signals received during the certain time; and a transmission timing control unit for determining a transmission timing of data for the D2D communication according to a congestion level corresponding to the detected energy levels.

The transmission timing control unit can include an energy level comparing module for comparing the energy levels with a certain threshold; determining the congestion level according to a comparison result of the energy levels with the certain threshold; and a timing determining module for determining the transmission timing corresponding to the determined congestion level.

The transmission timing control unit can increase a transmission window size of the transmission timing as a congestion degree according to the determined congestion level increases.

Figure 21:
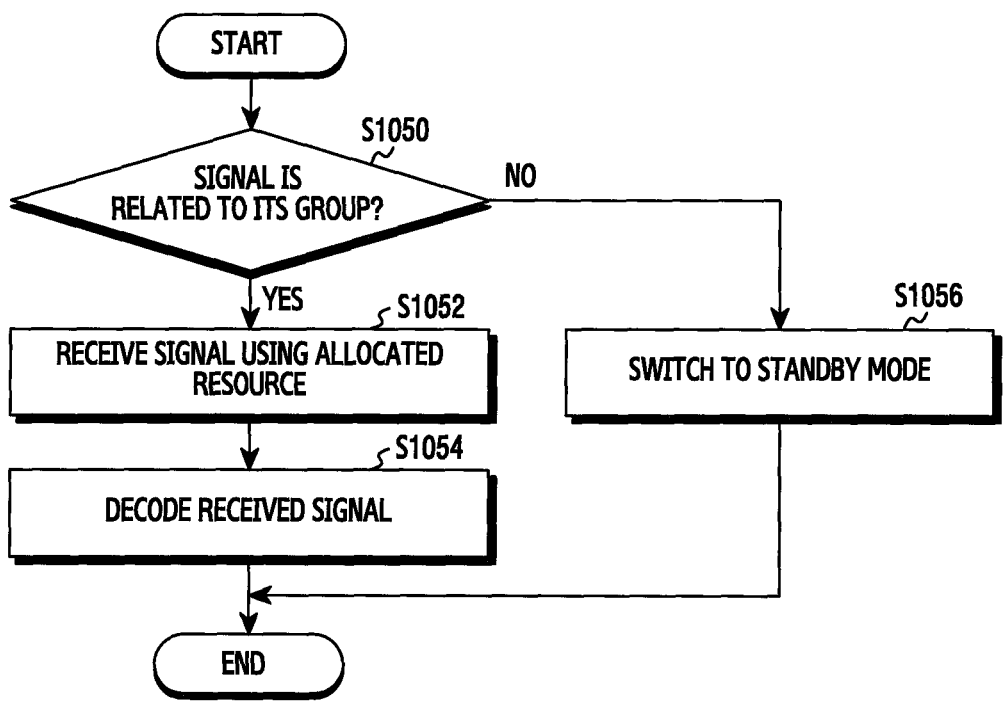
FIG. 21 is a flowchart of an embodiment to explain an operating method of a reception device over resource allocation of D2D communication in a wireless communication according to the present invention.

FIG. 21 is a flowchart of an embodiment to explain an operating method of a reception device through resource allocation of D2D communication in a wireless communication according to the present invention.

When a resource for a signal is allocated according to a resource structure including one or more RPs having a plurality of RBs based on a certain time, the resource is allocated by grouping per unit period when an interval where the certain time is added up for certain times is the unit period, and the signal is transmitted through the resource allocated by grouping per unit period, whether the signal is information relating to its group is determined (S1050). When system frame information indicating information about the resource allocated by grouping per unit period is received from the transmission device, the process for determining whether the signal is information relating to its group determines whether the signal is the information relating to its group using the system frame information.

As shown in FIG. 8B, the signal can be received and decoded during a first K TTI in each RP, and then switch to an idle mode during N-K TTI when the information is not related to its group. For doing so, it is necessary to assume that all of group members are synchronized precisely and that system frame number/frame number are known. It can be assumed that the synchronization is fulfilled between devices over a separate synchronization channel, and that every device receives the system frame number/frame number over a channel delivering separate system information.

That is, like MIB broadcast by the base station to devices in its managing cell, when the transmission device transmits the MIB to the reception device, the reception device determines whether the signal transmitted using the system frame number/frame number in TTIs corresponds to the information relating to its group.

In step S1050, when the signal corresponds to the information relating to its group, the reception device receives the signal from the transmission device through the allocated resource (S1052). As shown in FIG. 8B, after detecting the signal from the first K TTIs, when detecting the information relating to its group or information relating to a group to communicate, not its own group, the reception device receives corresponding data over N-K TTIs without switching to an idle state.

After step S1052, the reception device decodes the received signal (S1054).

Meanwhile, in step S1050, when the signal is transmitted through the resource allocated by grouping per unit period and the signal is not the information relating to its group, the reception device switches to the idle mode (S1056). To reduce power consumption of the receiving stage, the receiving stage receives and decodes the signal during the first K TTI in each RP, and then switch to the idle mode during N-K TTI when the information is not related to its group.

Figure 22:
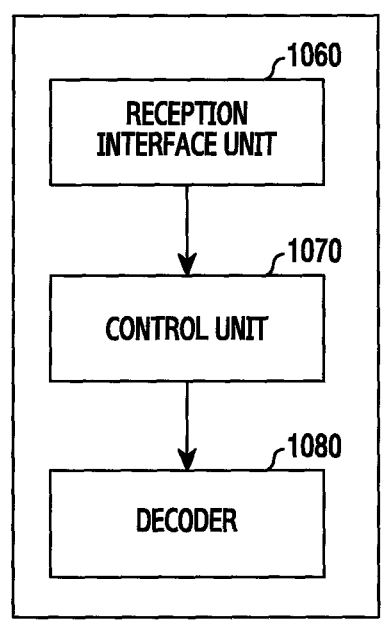
FIG. 22 is a block diagram of an embodiment to explain an operating apparatus of a reception device over resource allocation of D2D communication in a wireless communication according to the present invention.

FIG. 22 is a block diagram of an embodiment to explain an operating apparatus of a reception device over resource allocation of D2D communication in a wireless communication according to the present invention, and includes a reception interface unit 1060, a control unit 1070, and a decoder 1080.

The reception interface unit 1060 interfaces signal reception from a transmission device.

When a resource for a signal is allocated according to a resource structure including one or more RPs having a plurality of RBs based on a certain time, the control unit 1070 controls to receive the signal from the transmission device through the allocated resource.

The allocated resource is allocated by grouping per unit period when an interval where the certain time is added up for certain times is the unit period. In so doing, when receiving the signal through the resource allocated by grouping per unit period, the control unit 1070 determines whether the signal is information relating to its group, and controls to receive the signal when the signal corresponds to the information relating to its group.

When system frame information indicating information about the resource allocated by grouping per unit period is provided from the transmission device, the control unit 1070 determines using the system frame information whether the signal is the information relating to its group.

Like MIB broadcast by a base station to devices in its managing cell, when the transmission device transmits the MIB to the reception device, the control unit 1070 determines whether the transmitted signal corresponds to the information relating to its group using the system frame number/frame number in TTIs. When the signal corresponds to the information relating to its group, the control unit 1070 controls to receive the signal from the transmission device through the allocated resource. As shown in FIG. 8B, after detecting the signal from the first K TTIs, when detecting the information relating to its group or information relating to a group to communicate, not its own group, the control unit 1080 receives corresponding data over N-K TTIs without switching to an idle state.

Meanwhile, when the signal is transmitted through the resource allocated by grouping per unit period and the signal is not the information relating to its group, the control unit 1070 controls to switch to a standby mode. To reduce power consumption of a receiving stage, the control unit 1070 receives and decodes the signal during the first K TTI in each RP, and then switch to the idle mode during N-K TTI when the information is not related to its group.

The decoder 1080 decodes the received signal.

Figure 23:
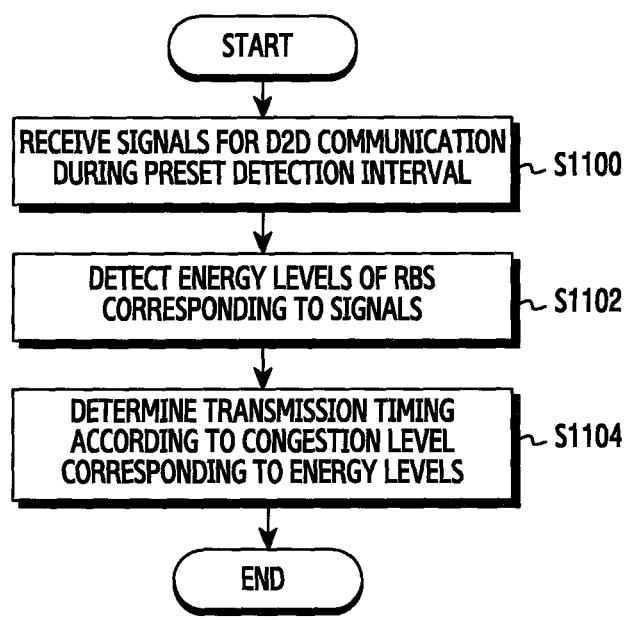
FIG. 23 is a flowchart of another embodiment to explain an operating method of a transmission device over resource allocation of D2D communication in a wireless communication according to the present invention.

FIG. 23 is a flowchart of another embodiment to explain an operating method of a transmission device through resource allocation of D2D communication in a wireless communication according to the present invention.

Signals for the D2D communication are received during a preset time (S1100).

After step S1100, energy levels of RBs corresponding to the signals received during the certain time are detected (S1102). For example, the transmission device desiring the D2D communication in RP of each group detects the energy levels of the RBs belonging to each RP during K TTI (1 TTI=1 ms).

After step S1102, the transmission timing of data for the D2D communication is determined according to a congestion level corresponding to the detected energy levels (S1104).

Figure 24:
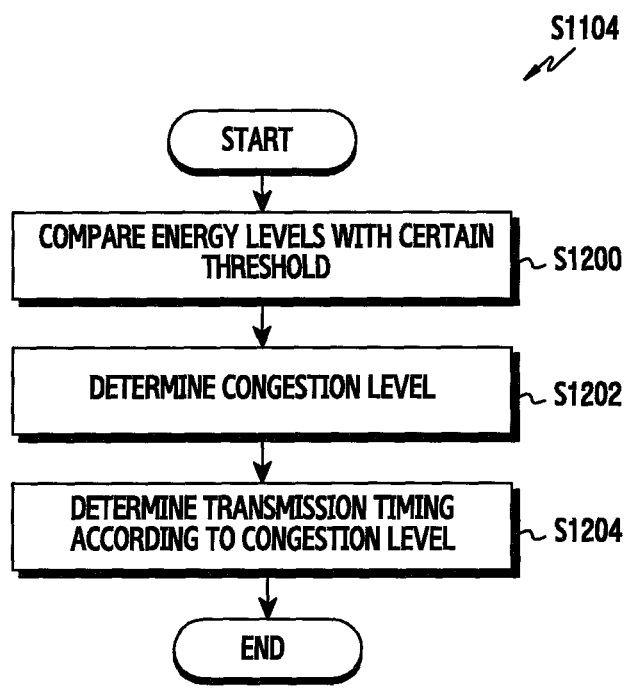
FIG. 24 is a flowchart of an embodiment to explain a process for determining a transmission timing according to a congestion level of FIG. 23.

FIG. 24 is a flowchart of an embodiment to explain a process for determining a transmission timing according to a congestion level of FIG. 23.

The energy levels are compared with a certain threshold (S1200). For example, when the energy levels of the RBs belonging to each RP are detected during K TTI (1 TTI=1 ms) in FIG. 8, the detected energy levels are compared with a size of a preset threshold.

After S1200, the congestion level is determined according to a comparison result of the energy levels and the certain threshold (S1202). The congestion level can be defined as two levels of high/low, three levels of High/medium/low, or four or more levels of Level 1, Level 2, Level 3, Level 4, . . . , and can be adjusted if necessary. For example, in a case where the congestion level is two levels corresponding to FIG. 10A, the congestion level being low can be determined when the number of RBs having the energy level below the threshold is greater than X or when the number of RBs having the energy level over the threshold is smaller than X. However, in an opposite case, the congestion level being high can be determined. Also, the congestion level being low can be determined when the number of RBs having the energy level below the threshold exceeds Y [%] of the whole RB or when the number of RBs having the energy level over the threshold falls below Y [%] of the whole RB. However, in an opposite case, the congestion level being high can be determined. Also, even when the congestion level includes three levels or four or more levels, the congestion level can be determined in the same manner as described above.

After step S1202, the transmission timing corresponding to the determined congestion level is determined (S1204). As an example of determining the transmission timing, a transmission window size of the transmission timing is increased as the congestion degree increases according to the determined congestion level. The transmission window size is preset according to the congestion level in FIG. 10. That is, when the congestion level includes two levels corresponding to FIG. 10A, at the low (No) congestion level, the transmission window size is reduced because a collision in the data transmission occurs relatively less. However, at the high (Yes) congestion level, the transmission window size is increased because a collision in the data transmission occurs relatively frequently. Also, when the congestion level includes three or four or more levels, the transmission window size of the transmission timing is increased as the congestion degree increases in the same manner as described above.

Figure 25:
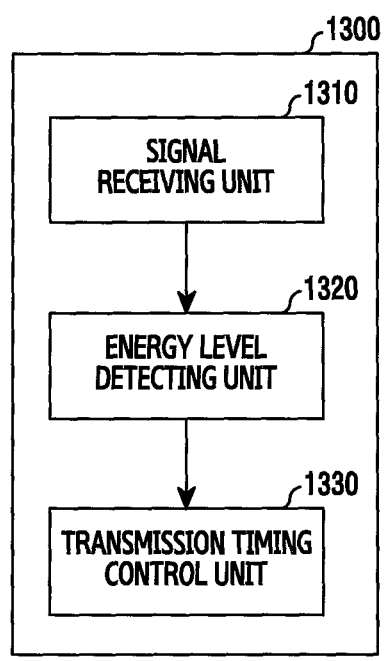
FIG. 25 is a block diagram of yet another embodiment to explain an operating apparatus of a transmission device over resource allocation of D2D communication in a wireless communication according to the present invention.

FIG. 25 is a block diagram of yet another embodiment 1300 to explain an operating apparatus of a transmission device over resource allocation of D2D communication in a wireless communication according to the present invention, and includes a signal detecting unit 1310, an energy level detecting unit 1320, and a transmission timing control unit 1330.

The signal detecting unit 1310 receives signals for the D2D communication during a certain time, and sends the received signal to the energy level detecting unit 1320.

The energy level detecting unit 1320 detects energy levels of RBs corresponding to the signals received during the certain time, and sends a detection result to the transmission timing control unit 1330. For example, the energy level detecting unit 1320 detects the energy levels of the RBs belonging to each RP during K TTI (1 TTI=1 ms).

The transmission timing control unit 1330 determines the transmission timing of data for the D2D communication according to a congestion level corresponding to the detected energy levels.

Figure 26:
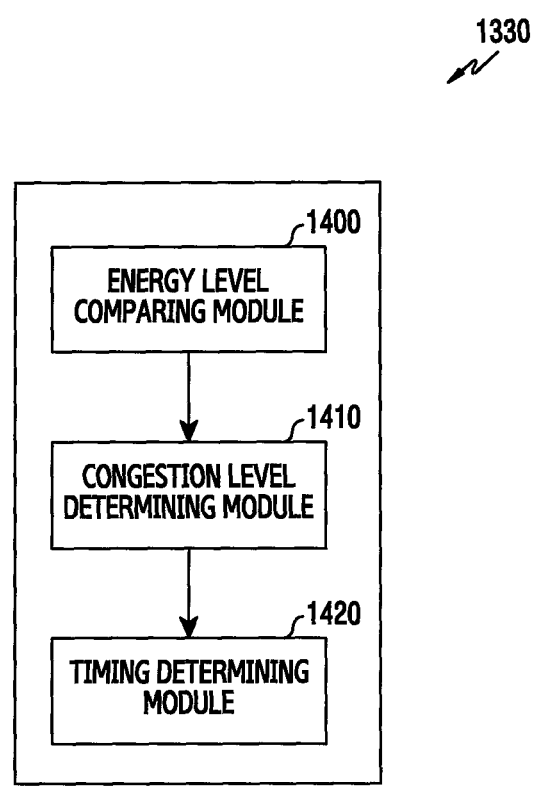
FIG. 26 is a block diagram of an embodiment to explain a transmission timing control unit of FIG. 25.

FIG. 26 is a block diagram of an embodiment to explain a transmission timing control unit of FIG. 25, and include an energy level comparing module 1400, a congestion level determining module 1410, and a timing determining module 1420.

The energy level comparing module 1400 compares the energy levels with a certain threshold, and sends a comparison result to the congestion level determining module 1410. For example, when detecting the energy levels of the RBs belonging to each RP during K TTI (1 TTI=1 ms), the energy level comparing module 1400 compares the detected energy levels with a size of a preset threshold.

The congestion level determining module 1410 determines the congestion level according to a comparison result of the energy levels and the threshold, and sends a determination result to the timing determining module 1420. The congestion level determining module 1410 stores table information regarding the congestion level defined to two levels of high/low, three levels of High/medium/low, or four or more levels of Level 1, Level 2, Level 3, Level 4, . . . , and the transmission window size corresponding to the congestion level. Meanwhile, such table information may be stored in a separate storage space.

For example, in a case where the congestion level includes two levels corresponding to FIG. 10A, when the number of RBs having the energy level below a certain threshold is greater than X or when the number of RBs having the energy level over the certain threshold is smaller than X, the congestion level determining module 1410 can determine the congestion level being low. On the contrary, the congestion level being high can be determined. Also, when the number of RBs having the energy level below a certain threshold exceeds Y [%] of the whole RB or when the number of RBs having the energy level over the certain threshold falls below Y [%] of the whole RB, the congestion level determining module 1410 can determine the congestion level being low. In an opposite case, the congestion level being high can be determined. Also, even when the congestion level include three levels or four or more levels, the congestion level determining module 1410 can determine the congestion level in the same manner as described above.

The timing determining module 1420 determines the transmission timing corresponding to the determined congestion level. As the congestion degree increases according to the determined congestion level, the timing determining module 1420 increases the transmission window size of the transmission timing.

For example, when the congestion level includes two levels corresponding to FIG. 10A, the timing determining module 1420 reduces the transmission window size at the low (No) congestion level. However, the transmission window size is increased at the high (Yes) congestion level. Also, when the congestion level includes three or four or more levels, the timing determining module 1420 increases the transmission window size of the transmission timing as the congestion degree increases in the same manner as described above.

As above, while the present invention has been described with reference to specific embodiments and drawings, the present invention is not limited to the mentioned embodiments and those skilled in the art to which the present invention pertains can make various modifications and changes from the disclosure.

Operations according to an embodiment of the present invention can be implemented by a single controller. In this case, program instructions for fulfilling operations embodied by various computers can be recorded in a computer-readable medium. The computer-readable medium can include program instructions, data files, and data structures, alone or in combination. The program instructions may be specially designed and configured for the present invention or known to and used by those of ordinary skilled in the art. Examples of the computer-readable recording medium include a hard disk, a magnetic medium such as a floppy disk and a magnetic tape, an optical recording medium such as Compact Disc (CD)-Read Only Memory (ROM) or a Digital Versatile Disc (DVD), magneto-optical medium such as a floptical disk, and hardware devices specially configured to store and execute program instructions such as ROM, Random Access Memory (RAM), and flash memory. Examples of the program instructions include not only a machine code made by a compiler but also a high-level language code executable by a computer using an interpreter. When all or part of a base station or a relay explained in the present invention is realized as a computer program, the computer-readable recording medium storing the computer program is also included in the present invention. Accordingly, the scope of the present invention is not limited and confined to the described embodiments, and should be defined by the claims as below and their equivalents.

What is claimed is:

1. A method for operating an electronic device over resource allocation of device to device (D2D) communication in a wireless communication system, the method comprising:
   generating D2D control information for the D2D communication;
   mapping the D2D control information to symbols for at least one of a physical downlink control channel (PDCCH), a physical uplink shared channel (PUSCH), and demodulation-reference signal (DM-RS) based on format of the D2D control information according to size of the D2D control information; and
   transmitting, to another electronic device, the D2D control information through the mapped symbols.

2. The method of claim 1, wherein the D2D control information comprises one or more of resource block assignment information, modulation and coding scheme (MCS) information, redundancy version (RV) information, new data indicator (NDI) information, and cyclic shift information for DM-RS and orthogonal complementary code (OCC) index information, and
wherein the D2D control information is mapped to the symbols for the PDCCH or the PUSCH.

3. The method of claim 2, wherein mapping the D2D control information to the symbols for the PDCCH comprises:
adding at least one of a groupcast identifier (ID) and a broadcast ID of a group based on a range of the D2D communication, to the D2D control information; and
mapping the D2D control information added with the groupcast ID or the broadcast ID to the symbols for the PDCCH.

4. The method of claim 3, wherein the D2D control information comprises cyclic redundancy code (CRC) masked with one of the groupcast ID and the broadcast ID.

5. The method of claim 3, wherein mapping the D2D control information to the symbols for the PDCCH comprises:
convolution-coding the D2D control information added with the groupcast ID or the broadcast ID;
matching a rate for the convolution-coded the D2D control information;
scrambling the rate-matched D2D control information using one of the groupcast ID and the broadcast ID;
modulating the scrambled D2D control information;
interleaving the modulated D2D control information;
group-specific cyclic shifting the interleaved D2D control information; and
mapping the cyclic shifted D2D control information to the symbols for the PDCCH.

6. The method of claim 2, wherein mapping the D2D control information to the symbols for the PUSCH comprises:
convolution-coding the D2D control information;
matching a rate for the convolution-coded the D2D control information;
modulating the rate-matched D2D control information;
multiplexing the modulated D2D control information with modulated data information of the PUSCH; and
mapping the multiplexed control information with modulated data information to the symbols for the PUSCH.

7. The method of claim 6, wherein the D2D control information is mapped to symbols adjacent to DM-RS of the PUSCH.

8. The method of claim 1, wherein D2D control information comprises new data indicator (NDI) information, and
wherein the D2D control information is mapped to the symbols for the PUSCH or the DM-RS.

9. The method of claim 8, wherein the new data indicator information is a bit indicating whether D2D data associated with the D2D control information is data for retransmission or not.

10. An apparatus of an electronic device for resource allocation of device to device (D2D) communication in a wireless communication system, the apparatus comprises:
at least one transceiver; and
at least one processor configured to:
generate D2D control information for the D2D communication;
map the D2D control information to symbols for at least one of a physical downlink control channel (PDCCH), a physical uplink shared channel (PUSCH), and demodulation-reference signal (DM-RS) based on format of the D2D control information according to size of the D2D control information; and
transmit, to another electronic device, the D2D control information through the mapped symbols.

11. The apparatus of claim 10, wherein the D2D control information comprises one or more of resource block assignment information, modulation and coding scheme (MCS) information, redundancy version (RV) information, new data indicator (NDI) information, and cyclic shift information for DM-RS and orthogonal complementary code (OCC) index information.

12. The apparatus of claim 11,
wherein the at least one processor is further configured to
add at least one of a groupcast identifier (ID) and a broadcast ID of a group based on a range of the D2D communication, to the D2D control information, and
map the D2D control information added with the groupcast ID or the broadcast ID to the symbols for the PDCCH.

13. The apparatus of claim 12, wherein the D2D control information comprises cyclic redundancy code (CRC) masked with one of the groupcast ID and the broadcast ID.

14. The apparatus of claim 12,
wherein the at least one processor is further configured to:
convolution-code the D2D control information added with the groupcast ID or the broadcast ID;
match a rate for the convolution-coded the D2D control information;
scramble the rate-matched D2D control information using one of the groupcast ID and the broadcast ID;
modulate the scrambled D2D control information;
interleave the modulated D2D control information;
group-specific cyclic shift the interleaved D2D control information; and
map the D2D control information added with the groupcast ID or the broadcast ID to the symbols for the PDCCH.

15. The apparatus of claim 11,
wherein the at least one processor is further configured to:
convolution-code the D2D control information;
match a rate for the convolution-coded the D2D control information;
modulate the rate-matched D2D control information;
multiplex the modulated D2D control information with modulated data information of the PUSCH; and
map the D2D control information to the symbols for the PUSCH.

16. The apparatus of claim 15, wherein the D2D control information is mapped to symbols adjacent to DM-RS of the PUSCH.

17. The apparatus of claim 10, wherein D2D control information comprises new data indicator (NDI) information, and
wherein the D2D control information is mapped to the symbols for the PUSCH or the DM-RS.

18. The apparatus of claim 17, wherein the new data indicator information is a bit indicating whether D2D data associated with the D2D control information is data for retransmission or not.

19. The method of claim 1, wherein the format of the D2D control information is format A when the size of the D2D control information is equal to or less than 2 bits, or format B when the size of the D2D control information is more than 2 bits.

20. The method of claim 19, wherein the D2D control information of the format A is mapped to the symbols for the PDCCH or the PUSCH, and wherein the D2D control information of the format B is mapped to the symbols for the PUSCH or the DM-RS.

\* \* \* \* \*